United States Patent
Han et al.

(10) Patent No.: US 9,854,256 B2
(45) Date of Patent: Dec. 26, 2017

(54) APPARATUS AND METHOD OF PROCESSING IMAGES IN AN ELECTRONIC DEVICE

(71) Applicant: Samsung Electronics Co., Ltd., Gyeonggi-do (KR)

(72) Inventors: Dongkyoon Han, Gyeonggi-do (KR); Yongman Lee, Gyeonggi-do (KR); Soohyung Kim, Gyeonggi-do (KR); Jongho Kim, Gyeonggi-do (KR); Hyunhee Park, Seoul (KR); Jiyoung Yi, Gyeonggi-do (KR)

(73) Assignee: Samsung Electric Co., Ltd (KR)

( * ) Notice: Subject to any disclaimer, the term of this patent is extended or adjusted under 35 U.S.C. 154(b) by 238 days.

(21) Appl. No.: 14/751,991

(22) Filed: Jun. 26, 2015

(65) Prior Publication Data

US 2015/0381995 A1 Dec. 31, 2015

(30) Foreign Application Priority Data

Jun. 26, 2014 (KR) .................. 10-2014-0078722

(51) Int. Cl.
*H04N 19/18* (2014.01)
*H04N 19/186* (2014.01)
*H04N 9/64* (2006.01)

(52) U.S. Cl.
CPC ............ *H04N 19/186* (2014.11); *H04N 9/64* (2013.01)

(58) Field of Classification Search
USPC ........................................ 382/243, 253, 166
See application file for complete search history.

(56) References Cited

U.S. PATENT DOCUMENTS

| 5,412,423 A | 5/1995 | Ohashi |
| 5,959,693 A | 9/1999 | Wu et al. |
| 7,113,221 B2* | 9/2006 | Law ................ H04N 7/012 348/448 |
| 8,115,840 B2 | 2/2012 | Litvinov et al. |
| 8,270,747 B2* | 9/2012 | Isomura ............. H04N 19/50 382/251 |
| 2005/0094003 A1 | 5/2005 | Thorell |
| 2007/0097391 A1 | 5/2007 | Hwang |
| 2007/0211307 A1 | 9/2007 | Uvarov |
| 2009/0110305 A1 | 4/2009 | Fenney |
| 2009/0148059 A1* | 6/2009 | Matsuda ............. G06T 9/00 382/251 |
| 2009/0304073 A1* | 12/2009 | Usman .............. H04N 19/91 375/240.03 |
| 2012/0243791 A1 | 9/2012 | Rao |
| 2013/0107084 A1 | 5/2013 | Park et al. |
| 2013/0128061 A1 | 5/2013 | Hsu et al. |
| 2013/0176498 A1 | 7/2013 | Noutoshi et al. |

OTHER PUBLICATIONS

European Search Report dated Nov. 23, 2015 issued in counterpart application No. 15174127.9-1908, 8 pages.

\* cited by examiner

*Primary Examiner* — Ishrat I Sherali
(74) *Attorney, Agent, or Firm* — The Farrell Law Firm, P.C.

(57) ABSTRACT

Disclosed are an apparatus and method of encoding and decoding color images in an electronic device which includes a controller that analyzes pixel data of an image, determines a pixel pattern, and encodes the image according to the determined pixel pattern, and a display that displays the image under the control of the controller.

21 Claims, 28 Drawing Sheets

Image luminance pixel

Chrominance pixel

• Centroid of chrominance pixel

4:2:2

H: 1/2
V: 1/1
T: 1/2

☐ Image luminance pixel

☐ Chrominance pixel

• Centroid of chrominance pixel

4:4:0

H: 1/1
V: 1/2
T: 1/2

Image luminance pixel

Chrominance pixel

• Centroid of chrominance pixel

4:2:0

H: 1/2
V: 1/2
T: 1/4

☐ Image luminance pixel

☐ Chrominance pixel

• Centroid of chrominance pixel

Pattern 0

Pattern 0

Pattern 0

Pattern 1

Pattern 1

Pattern 2

Pattern 2

Pattern 3

Pattern 4

Pattern 5

Pattern 6

| ab | cd | ac | bd | ad | bc |

FIG. 9A

| Ya7 | Ya6 | Ya5 | Ya4 | Ya3 | Ya2 | Ya1 | Ya0 |
|---|---|---|---|---|---|---|---|
| Yb7 | Yb6 | Yb5 | Yb4 | Yb3 | Yb2 | Yb1 | Yb0 |
| Yc7 | Yc6 | Yc5 | Yc4 | Yc3 | Yc2 | Yc1 | Yc0 |
| Yd7 | Yd6 | Yd5 | Yd4 | Yd3 | Yd2 | Yd1 | Yd0 |
| CB1 ||||||| Flag 3 |
| CB2 ||||||| Flag 2 |
| CR1 ||||||| Flag 1 |
| CR2 ||||||| Flag 0 |

FIG. 9B

| Ya7 | Ya6 | Ya5 | Ya4 | Ya3 | Ya2 | Ya1 | Flag 7 |
|---|---|---|---|---|---|---|---|
| Yb7 | Yb6 | Yb5 | Yb4 | Yb3 | Yb2 | Yb1 | Flag 6 |
| Yc7 | Yc6 | Yc5 | Yc4 | Yc3 | Yc2 | Yc1 | Flag 5 |
| Yd7 | Yd6 | Yd5 | Yd4 | Yd3 | Yd2 | Yd1 | Flag 4 |
| CB1 | | | | | | | Flag 3 |
| CB2 | | | | | | | Flag 2 |
| CR1 | | | | | | | Flag 1 |
| CR2 | | | | | | | Flag 0 |

FIG. 9C

| Flag 7 | Ya7 | Ya6 | Ya5 | Ya4 | Ya3 | Ya2 | Ya1 |
|---|---|---|---|---|---|---|---|
| Flag 6 | Yb7 | Yb6 | Yb5 | Yb4 | Yb3 | Yb2 | Yb1 |
| Flag 5 | Yc7 | Yc6 | Yc5 | Yc4 | Yc3 | Yc2 | Yc1 |
| Flag 4 | Yd7 | Yd6 | Yd5 | Yd4 | Yd3 | Yd2 | Yd1 |
| Flag 3 | CB1 ||||||| 
| Flag 2 | CB2 |||||||
| Flag 1 | CR1 |||||||
| Flag 0 | CR2 |||||||

APPARATUS AND METHOD OF PROCESSING IMAGES IN AN ELECTRONIC DEVICE

PRIORITY

This application claims priority under 35 U.S.C. §119(a) to Korean Patent Application No. 10-2014-0078722, filed in the Korean Intellectual Property Office on Jun. 26, 2014, the contents of which are incorporated herein by reference.

BACKGROUND OF THE INVENTION

1. Field of the Invention

The present invention relates to an apparatus and method of encoding and decoding color images in an electronic device.

2. Description of the Related Art

Digital image data includes Red (R), Green (G), and Blue (B) color components or luminance (Y) and a plurality of color difference components (chrominance (C)). Color difference components may be produced from differences between the luminance signal (Y) representing the brightness of a video on an electronic device and the three basic colors signals, in which case the differences may be three color difference components: (RY), (GY) and (BY). The three basic colors may be reproduced by using the two color difference components, (RY) and (BY).

A digital image may be formed with a ratio of the luminance Y and the color difference components (B–Y and R–Y), 4:n:n, where the number, '4' denotes a sampling rate of a standard frequency 13.5 MHz, for converting analog TV signals into digital signals, and 'n' and 'm' denote the respective color difference components. There may be sampling schemes considering ratios of luminance and color difference components, e.g., 4:4:4, 4:2:2, and 4:1:1. The 4:4:4 scheme indicates that three components channels are sampled at 13.5 MHz. The 4:2:2 scheme indicates that when the Y signal is sampled every line at 13.5 MHz, the color difference signals are sampled every two lines at 6.75 MHz. The 4:1:1 scheme indicates that when the Y signal is sampled every line at 13.5 MHz, the color difference signals are sampled every four lines at 3.37 MHz.

Conventional electronic devices reduce the rates of color difference components to be less than the rate of a luminance component in a digital image including, for example, a luminance component, first color difference component and second color difference component. As such, the number of color difference components is reduced compared to the rate of the luminance component. In that case, although the size of image data may be reduced, the capability of displaying images also decreases. Accordingly, there is a need in the art for an improved method and apparatus for encoding and decoding images in an electronic device, such that the integrity of an image display is maintained.

SUMMARY OF THE INVENTION

The present invention has been made to address at least the problems and/or disadvantages described above and to provide at least the advantages described below.

Accordingly, an aspect of the present invention provides an apparatus and method that codes color difference data of pixels of a unit block, according to pixel patterns, when encoding a digital image that may include a luminance component, first color difference component and second color difference component.

In accordance with an aspect of the present invention, an electronic device includes a controller that analyzes pixel data of an image, determines a pixel pattern, and encodes the image according to the determined pixel pattern, and a display, functionally connected to the controller, that displays the image.

In accordance with another aspect of the present invention, a method of processing images in an electronic device includes analyzing pixel data of an image and outputting the analyzed pixel data, determining a pixel pattern based on the analyzed pixel data, and encoding the image according to the determined pixel pattern.

BRIEF DESCRIPTION OF THE DRAWINGS

The above and other aspects, features and advantages of the present invention will become more apparent from the following detailed description taken in conjunction with the accompanying drawings, in which:

FIGS. 7A to 7C illustrate a process of analyzing values of pixels in a unit block in an electronic device according to various embodiments of the present invention;

FIGS. 9A to 9C illustrate a process of configuring encoded data of a unit block in an electronic device according to various embodiments of the present invention;

DETAILED DESCRIPTION OF EMBODIMENTS OF THE INVENTION

Figure 1:
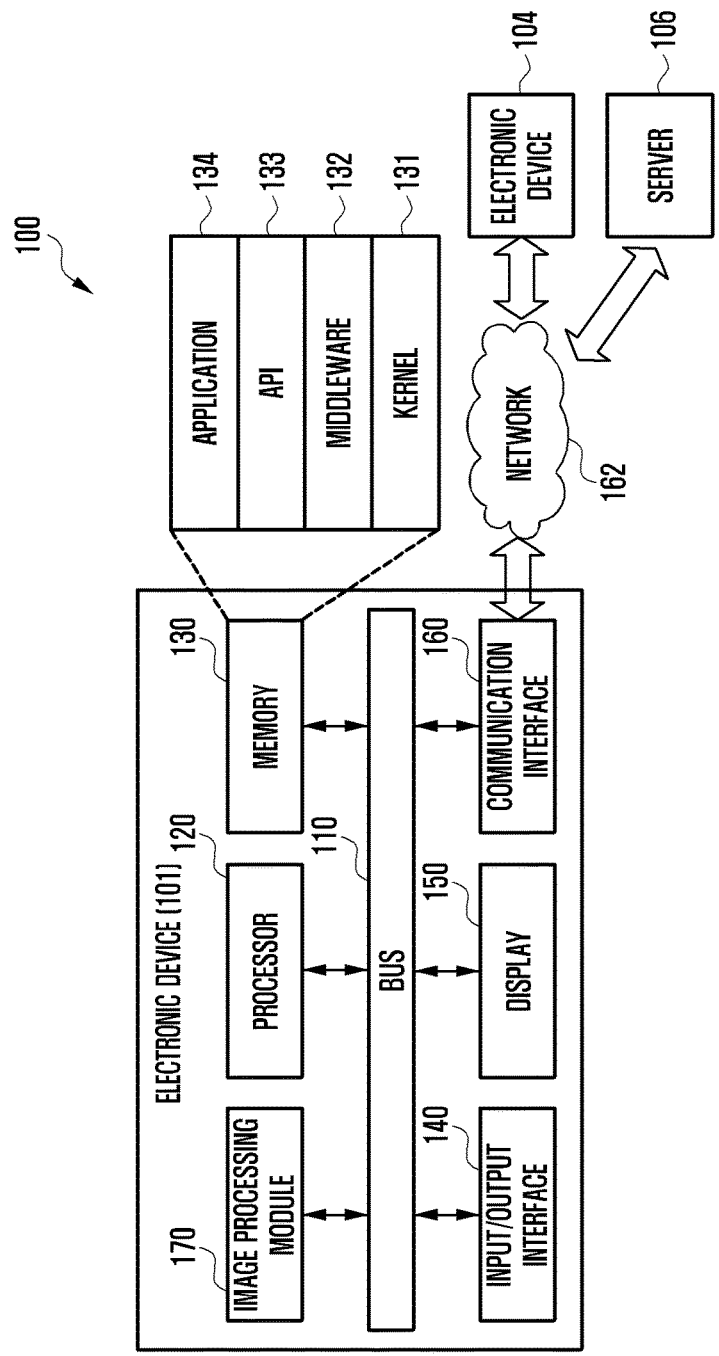
FIG. 1 illustrates a network environment 100 including an electronic device 101 according to various embodiments of the present invention.

Hereinafter, embodiments of the present invention will be described with reference to the accompanying drawings. Although specific embodiments are illustrated in the drawings and related detailed descriptions are discussed, the present invention may have various modifications and several embodiments. However, the present invention is not limited thereto and it should be understood that the present invention includes all changes and/or equivalents and substitutes included in the spirit and scope of various embodiments of the present invention. In connection with descriptions of the drawings, similar components are designated by the same reference numeral. A detailed description of related known configurations or functions incorporated herein will be omitted for the sake of clarity and conciseness.

The terms "include" or "includes" which may be used in describing various embodiments of the present invention refer to the existence of a corresponding disclosed function, operation or component which can be used in various embodiments of the present invention and does not limit one or more additional functions, operations, or components. In various embodiments of the present invention, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present invention, the expressions "or" or "at least one of A or/and B" include any or all of combinations of words listed together. For example, the expression "A or B" or "at least A or/and B" includes A, includes B, or includes both A and B.

The expression "1", "2", "first", or "second" used in various embodiments of the present invention may modify various components of the various embodiments but does not limit the corresponding components. For example, the above expressions do not limit the sequence and/or importance of the components. The expressions may be used for distinguishing one component from other components. For example, a first user device and a second user device indicate different user devices although both are user devices. For example, without departing from the scope of the present invention, a first structural element may be referred to as a second structural element, and the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present invention are only examples for describing a specific embodiment and do not limit the various embodiments of the present invention. Singular forms are intended to include plural forms unless the context clearly indicates otherwise.

Unless defined differently, all terms used herein, which include technical terminologies or scientific terminologies, have the same meaning as that understood by a person skilled in the art to which the present invention pertains. Such terms as those defined in a generally used dictionary are to be interpreted to have the same meanings as the contextual meanings in the relevant field of art, and are not to be interpreted to have ideal or excessively formal meanings unless clearly defined in the present description.

An electronic device according to various embodiments of the present invention may include an image processing function able to encode color difference data in accordance with pattern of pixels when processing image configured with pixel data, first color difference data and second color difference data.

For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, and a wearable device such as a Head-Mounted-Device (HMD) including electronic glasses, electronic clothes, and electronic bracelet, an electronic necklace, an electronic appcessary, an electronic tattoo, and a smart watch.

According to some embodiments, the electronic device may be a smart home appliance having a projection function. The smart home appliance includes at least one of a TeleVision (TV), a Digital Video Disk (DVD) player, an audio player, an air conditioner, a cleaner, an oven, a microwave oven, a washing machine, an air cleaner, a set-top box, a TV box such as Samsung HomeSync™, Apple TV™, or Google TV™, game consoles, an electronic dictionary, an electronic key, a camcorder, and an electronic frame.

According to some embodiments, the electronic device may include at least one of various types of medical devices such as Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship such as a navigation device or a gyro compass, avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices such as a water meter, an electricity meter, a gas meter, and a radio wave meter including a projection function. The electronic device according to various embodiments of the present invention may be one or a combination of the above-described various devices, and may be a flexible device. It is apparent to those skilled in the art that the electronic device according to various embodiments of the present invention is not limited to the above-described devices.

Hereinafter, the term "user" used in various embodiments may refer to a person who uses the electronic device or a device such as an artificial intelligence device which uses an electronic device.

FIG. 1 illustrates a network environment 100 including an electronic device 101 according to various embodiments of the present invention. Referring to FIG. 1, the electronic device 101 includes a bus 110, a processor 120, a memory 130, an input/output interface 140, a display 150, a communication interface 160, and a image-processing module 170.

The bus 110 is a circuit connecting and transmitting communication between the above-described components.

The processor 120 receives commands from other components of the electronic device 101 such as the memory 130, the input/output interface 140, the display 150, the communication interface 160, or the projecting management module 170 through the bus 110, analyzes the received commands, and executes calculation or data processing according to the analyzed commands.

The memory 130 stores commands or data received from the processor 120 or other components of the electronic device 101, or generated by the processor 120 or other components. The memory 130 includes a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources such as the bus 110, the processor 120, or the memory 130 used for executing an operation or function implemented by the other programming modules. The kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. In operation requests received from the application 134, the middleware 132 performs a control for the operation requests, such as scheduling or load balancing, by assigning a priority by which system resources of the electronic device 101 can be used, to the application 134.

The API 133 is an interface by which the application 134 can control a function provided by the kernel 131 or the middleware 132 and includes, for example, at least one interface or function for a file control, window control, image processing, or character control.

According to various embodiments, the application 134 includes a Short Message Service (SMS)/Multimedia Messaging Service (MMS), email, calendar, alarm application, health care such as for measuring quantity of exercise or blood sugar, or environment information application such as for providing information on barometric pressure, humidity or temperature. Additionally or alternatively, the application 134 may be related to an information exchange between the electronic device 101 and an external electronic device, such as a notification relay application for transferring particular information to the external electronic device or a device management application for managing the external electronic device.

For example, the notification relay application includes a function of transmitting notification information generated by another application of the electronic device 101 to the external electronic device 104. Additionally or alternatively, the notification relay application receives notification information from, for example, the external electronic device 104 and provides the received notification information to the user. The device management application manages at least a part of the functions of the external electronic device 104 communicating with the electronic device 101, an application executed in the external electronic device 104, and a service such as call or message service provided by the external electronic device 104.

According to various embodiments, the application 134 is designated according to an attribute or type of the external electronic device 104. For example, when the external electronic device 104 is an MP3 player, the application 134 is related to music reproduction. Similarly, when the external electronic device 104 is a mobile medical device, the application 134 is related to health care. According to an embodiment, the application 134 includes at least one of an application designated to the electronic device 101 and an application received from an external electronic device, such as the server 106 or electronic device 104.

The input/output interface 140 transmits a command or data input from the user through an input/output device such as a sensor, keyboard, or touch screen to the processor 120, the memory 130, the communication interface 160, or the display control module 170 through the bus 110. For example, the input/output interface 140 provides data on a user's touch input through a touch screen to the processor 120, and outputs a command or data received, through the bus 110, from the processor 120, the memory 130, the communication interface 160, or the projecting management module 170 through the input/output device such as a speaker or a display.

The display 150 displays various pieces of information to the user.

The communication interface 160 connects communication between the electronic device 101 and the external device. For example, the communication interface 160 accesses a network 162 through wireless or wired communication to communicate with the external device. The wireless communication includes at least one of, for example, WiFi, BlueTooth® (BT), Near Field Communication (NFC), a Global Positioning System (GPS), and cellular communication such as Long Term Evolution (LTE), LTE-Advanced (LTE-A), Code Division Multiple Access (CDMA), Wideband CDMA (WCDMA), Universal Mobile Telecommunications Service (UMTS), WiBro or Global System for Mobile Communications (GSM). The wired communication includes at least one of a Universal Serial Bus (USB), a High Definition Multimedia Interface (HDMI), Recommended Standard 232 (RS-232), and a Plain Old Telephone Service (POTS).

According to an embodiment, the network 162 is a telecommunication network including at least one of a computer network, Internet, Internet of Things, and a telephone network. A protocol such as transport layer, data link layer, or physical layer protocol for communication between the electronic device 101 and the external device may be supported by at least one of the application 134, the API 133, the middleware 132, the kernel 131, and the communication interface 160.

According to an embodiment, at least one of functions performed by the electronic device 101 can be performed by the external device. For example, the server 106 includes an image processing server module corresponding to the image-processing module 170, and the server 106 can process at least one of functions relating to a user using the image processing server module and transmit result to the electronic device 101.

Figure 2:
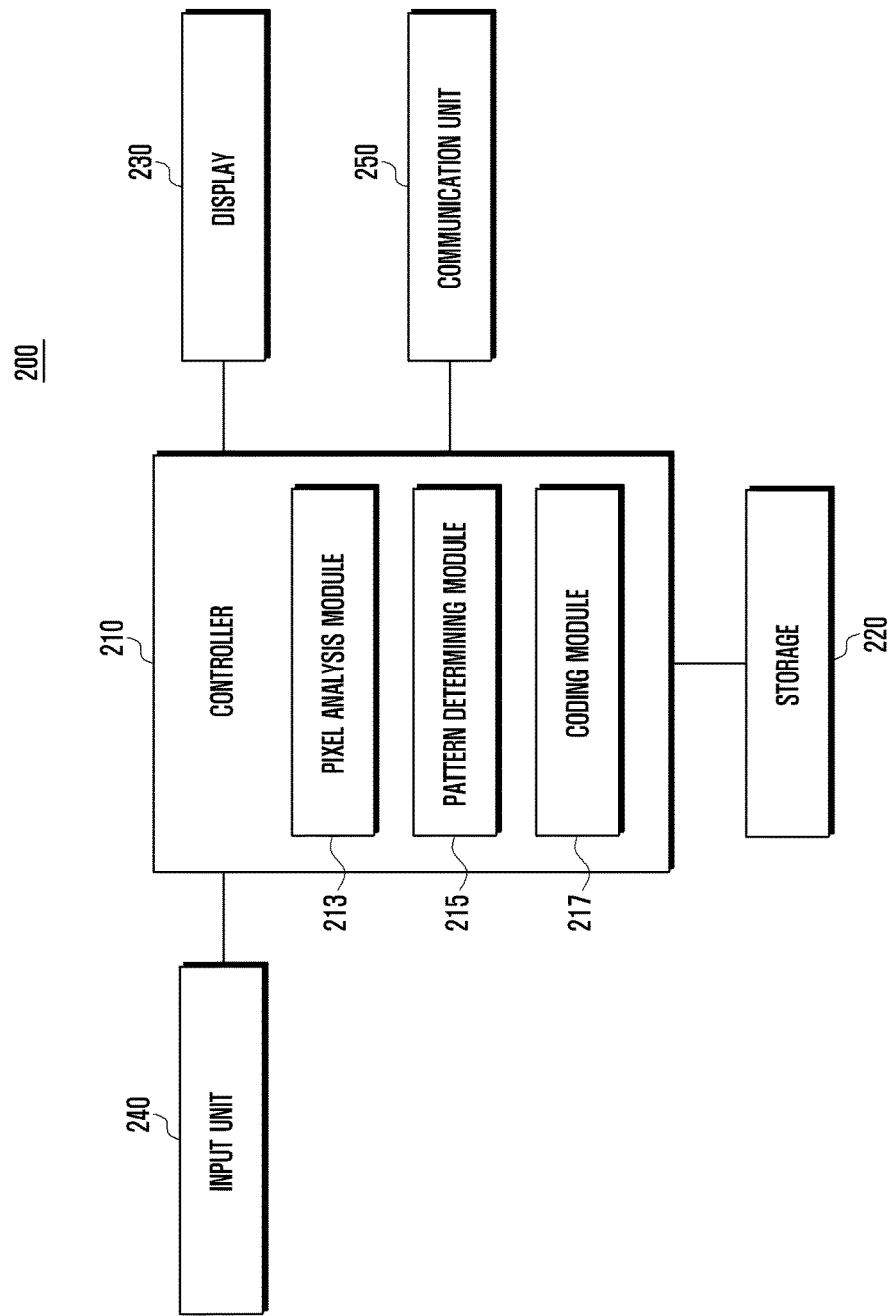
FIG. 2 illustrates a schematic block diagram of an electronic device for processing images according to various embodiments of the present invention.

FIG. 2 illustrates a schematic block diagram of an electronic device 200 (e.g., electronic device 101 shown in FIG. 1) for processing images according various embodiments of the present invention. The electronic device 200 includes a controller 210, a storage 220, a display 230, an input unit 240 and a communication unit 250. Referring to FIG. 1, the controller 210 may be a processor (e.g., Application Processor (AP), a hardware module, a software module, and firmware, which are controlled by the processor, or a combination thereof. According to an embodiment, the controller 210 includes control logic corresponding to at least part of the functions of the image-processing module 170, executed by the processor 120. The controller 210 includes a pixel analysis module 213, a pattern-determining module 215, and a coding module 217 that performs encoding, in order to process the color image from the image-processing module 170.

The controller 210 determines a pixel pattern of an image by analyzing pixel data of the image, and encodes the image according to the determined pixel pattern. An example of the image is a video shown on the display 230. The image includes elements such as objects including one or more persons, place or things.

The pixel data includes at least one of luminance data, first color difference data and second color difference data, which may be YCbCr representing a color space. In that case, the luminance data may be Y representing a luminance signal. For example, the first color difference data may be Cb representing the color difference signal of blue, and the second color difference data may be Cr representing the color difference signal of red.

According to an embodiment, the controller 210 determines a pixel pattern of an image by analyzing one of luminance data, first color difference data or second color difference data, as a unit of a block (unit block), and encodes the first color difference data Cb or second color difference data Cr, according to the determined pixel pattern. For example, the data used to analyze a pixel pattern as a unit block may be luminance data, and the data encoded according to the determined pixel pattern may be Cb and Cr.

According to an embodiment, in operation of the controller 210, the pixel analysis module 213 analyzes luminance data in the size of a unit block and creates pixel analysis data. The pattern-determining module 215 determines a pixel pattern corresponding to the pixel analysis data and outputs flag data of the determined pixel pattern. The encoding module 217 compresses and encodes Cb and Cr data according to the determined pattern, and creates encoded data including the Cb and Cr data compressed and encoded, the flag data, and the luminance data.

According to an embodiment, the controller 210 may further include a color space conversion module which can convert an image format of the image before the process of the pixel analysis module 213. The color space conversion module receives RGB image as an input image and converts the input image to a YCbCr image.

According to an embodiment, the storage 220 stores images encoded by the controller 210. The storage 220 stores flag data in a Table. For example, the flag data may be used to determine a pixel pattern in the controller 210 according to the analyzed pixel data. The encoded data including flag data corresponding to the determined pixel pattern may be stored in the storage 220.

The flag data may be information with results by analyzing a pixel pattern and may be used to analyze the pixel pattern.

According to an embodiment, the controller 210 controls the display 230 to display still or moving images. The controller 210 receives input images through the input unit 240, such as RGB data or YCbCr data. The input unit 240 includes a color space converter for converting RGB data to YCbCr 444 data.

FIGS. 3A to 3D illustrate configurations of pixels for an image in an electronic device according to various embodiments of the present invention.

Referring to FIGS. 3A to 3D, images are formed with luminance pixels and chrominance pixels.

According to an embodiment, an image may be a component image and may be formed with luminance Y and color difference signals such as Cb and Cr. The color resolution of an image may be represented with 4:n:m, in which '4' denotes a sampling rate of a standard frequency 13.5 MHz, for converting analog TV signals into digital signals, and 'n' and 'm' denote the rates of the corresponding color difference signals, Cb and Cr, respectively. For YCbCr 4 nm, '4' denotes the number of Y pixels sorted by a unit block. YCbCr 4 nm may be YCbCr 444, YCbCr 422 or YCbCr 420. When YCrCb 4 nm is restored, the decoder restores color difference data Cb and Cr to RGB data by using Y data. According to various embodiments, YCbCr 4 nm may be a unit block. As shown in FIGS. 3A to 3D, 'H' denotes horizontal chrominance resolution, 'V' denotes vertical chrominance resolution and 'T' denotes total chrominance resolution.

Figure 3A:
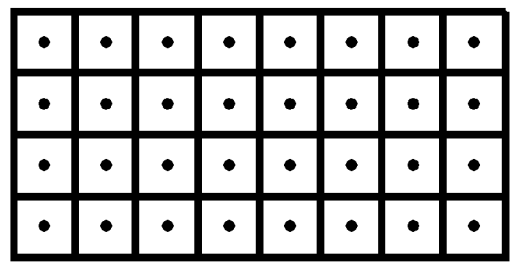
FIGS. 3A to 3D illustrate diagrams that describes configurations of pixels for an image in an electronic device according to various embodiments of the present invention.
Figure 3A:
Figure 3A:
Figure 4:
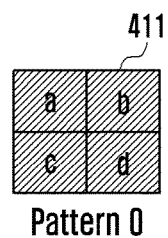
FIG. 4 illustrates examples of a pattern of pixels in a unit block in an electronic device according to various embodiments of the present invention.
Figure 4:
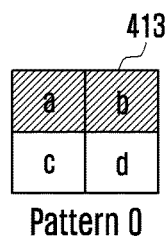
Figure 4:
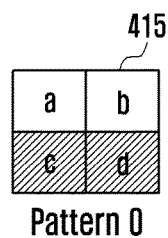
Figure 4:
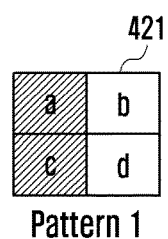
Figure 4:
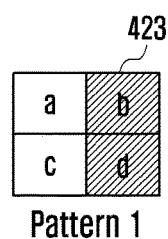
Figure 4:
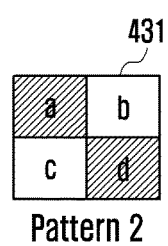
Figure 4:
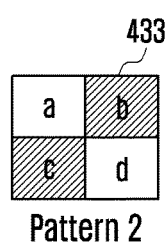
Figure 4:
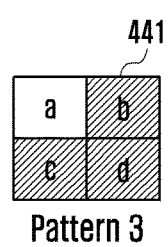
Figure 4:
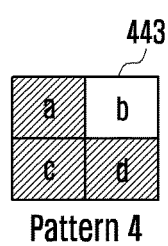
Figure 4:
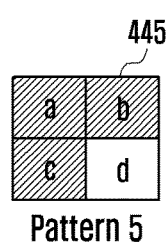
Figure 4:
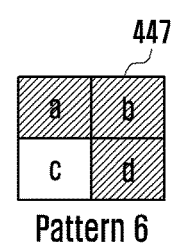

As shown in FIG. 3A, 4:4:4 indicates that three components channels are identically sampled at 13.5 MHz. The color resolution of 4:4:4 indicates that the pixels of luminance Y and color difference signals Cb and Cr have the same rate.

Figure 3B:
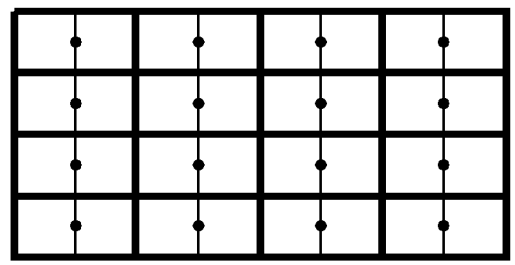

As shown in FIG. 3B, 4:2:2 indicates that when the Y signal is sampled every line at 13.5 MHz, the color difference signals are sampled every two lines as horizontal lines at 6.75 MHz. The color resolution 4:2:2 indicates that the respective rates of pixels of color difference signals Cb and Cr are a half of those of luminance Y pixel.

Figure 3C:
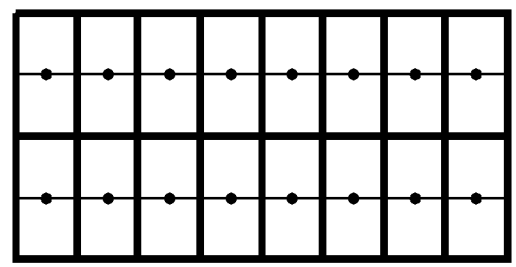
Figure 3C:
Figure 3C:

As shown in FIG. 3C, 4:4:0 indicates that when the Y signal is sampled every line at 13.5 MHz, the color difference signals are sampled every two lines as vertical lines at 6.75 MHz. The color resolution 4:4:0 indicates that the respective rates of pixels of color difference signals Cb and Cr are a half of those of luminance Y pixel.

Figure 3D:
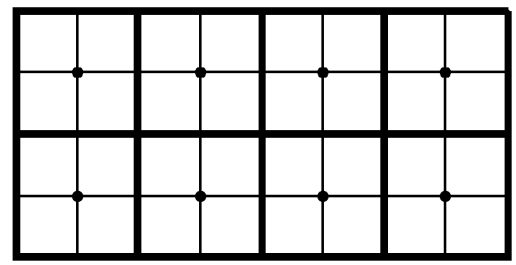

As shown in FIG. 3D, 4:2:0 indicates that when the Y signal is sampled every line at 13.5 MHz, the color difference signals are sampled every two lines as horizontal lines at 6.75 MHz and every two lines as vertical lines at 6.75 MHz. The color resolution of 4:2:0 indicates that the respective rates of pixels of color difference signals Cb and Cr are a quarter of that of luminance Y pixel.

An image of a color resolution shown in FIG. 3B and/or FIG. 3 may be less than that of 4:4:4 shown in FIG. 3A. The electronic device according to various embodiments displays images in various forms. Since the images shown in FIGS. 3B to 3D are formed in such a manner that the rates of pixels of color difference signals are less than those of the luminance Y, the images may be displayed in a relatively low quality representation according to pixel patterns. For example, user interface images and graphic images may have an abrupt change at the boundaries according to objects forming the image. In that case, when the pixels of color difference signals are reduced with the pixel pattern shown in FIG. 3B or 3C, the boundaries of the image may not be clearly displayed.

The electronic device according to various embodiments of the present invention encodes color difference signals, shown in FIG. 3B or 3C, by using a method that determines a pixel pattern of a unit block by analyzing pixels in a size of a unit block, and encodes pixels of color difference signals according to the determined pixel pattern. The controller 210 encodes pixels of a color difference signal according to a pixel pattern of a unit block, thereby reducing blue at the boundaries of an image displayed on the display 230 and thus displaying the image with sharp boundaries.

FIG. 4 illustrates examples of a pattern of pixels in a unit block in an electronic device according to various embodiments of the present invention.

Referring to FIG. 4, pixels of a unit block (e.g., 4 pixels) may have different values, and may have unique patterns according to values of the pixels. For example, when an encoding process is performed to convert a unit block of 4 pixels into 2 pixels (e.g., an image of resolution 4:4:4 is encoded to an image of resolution 4:2:2), the controller 210 compares values of pixels of a unit block with a preset threshold, respectively, analyzes the comparison results, and determines patterns of pixels in unit blocks.

After analyzing pixels of a unit block, the controller 210 determines a pattern of pixels that have values greater than a threshold and a pattern of pixels that have values less than the threshold, within the unit block. The values of pixels within the unit block may be properly encoded according to the determined pattern. The unit block for analyzing patterns may use luminance pixels or color difference pixels. In an electronic device according to various embodiments of the present invention, luminance pixels are used to determine patterns. The controller 210 determines pixel patterns of a unit block using luminance pixels and encodes color difference pixels of a unit block corresponding to the determined pattern.

Reference numerals 411 to 415 of FIG. 4 are examples of a pattern as pixels with similar values are located in the top and bottom in a unit block. In that case, the controller 210 creates flag data pattern 0. The controller 210 creates first encoding data (e.g., CB1, CR1) by calculating (a+b)/2 from color difference pixels of a corresponding unit block and second encoding data (e.g., CB2, CR2) by calculating (c+d)/2 from color difference pixels of a corresponding unit block.

Reference numerals 421 and 423 of FIG. 4 are examples of a pattern as pixels with similar values are located in the left-hand side and right-hand side of a unit block. In that case, the controller 210 creates flag data pattern 1. The controller 210 creates first encoding data (e.g., CB1, CR1) by calculating (a+c)/2 from color difference pixels of a corresponding unit block and second encoding data (e.g., CB2, CR2) by calculating (b+d)/2 from color difference pixels of a corresponding unit block.

Reference numerals 431 and 433 of FIG. 4 are examples of a pattern as pixels with similar values are diagonally located in a unit block. In that case, the controller 210 creates flag data pattern 2. The controller 210 creates first encoding data (e.g., CB1, CR1) by calculating (a+d)/2 from color difference pixels of a corresponding unit block and second encoding data (e.g., CB2, CR2) by calculating (b+c)/2 from color difference pixels of a corresponding unit block.

Reference numerals 441 to 447 of FIG. 4 are examples of a pattern as three of the four pixels with a value and the other pixel with another value are located in a unit block. As shown at reference numeral 441, when one of the four pixels, a, has a value, and the other three, b, c, and d, have another value, the controller 210 creates flag data pattern 3. The controller 210 creates first encoding data (e.g., CB1, CR1) by the value of a pixel from color difference pixels of a corresponding unit block and second encoding data (e.g., CB2, CR2) by calculating (b+c+d)/3 from color difference pixels of a corresponding unit block.

As shown at reference numeral 443, when one of the four pixels, b, has a value, and the other three, a, c, and d, have another value, the controller 210 creates flag data pattern 4. The controller 210 creates first encoding data (e.g., CB1, CR1) by the value of pixel b from color difference pixels of a corresponding unit block and second encoding data (e.g., CB2, CR2) by calculating (a+c+d)/3 from color difference pixels of a corresponding unit block. As shown at reference numeral 447, when one of the four pixels, c, has a value, and the other three, a, b, and d, have another value, the controller 210 creates flag data pattern 6.

The controller 210 creates first encoding data (e.g., CB1, CR1) by the value of pixel c from color difference pixels of a corresponding unit block and second encoding data (e.g., CB2, CR2) by calculating (a+b+d)/3 from color difference pixels of a corresponding unit block. As shown at reference numeral 445, when one of the four pixels, d, has a value, and the other three, a, b, and c, have another value, the controller 210 creates flag data pattern 5. The controller 210 creates first encoding data (e.g., CB1, CR1) by the value of pixel d from color difference pixels of a corresponding unit block and second encoding data (e.g., CB2, CR2) by calculating (a+b+c)/3 from color difference pixels of a corresponding unit block.

According to another embodiment, when the pixel values of the unit block have the patterns indicated by reference numerals 441 to 447, the controller 210 creates first encoding data (e.g., CB1 and CR1) by calculating the average of three pixels with a value and sets the other pixel's value to second encoding data (e.g., CB2, CR2).

Figure 5:
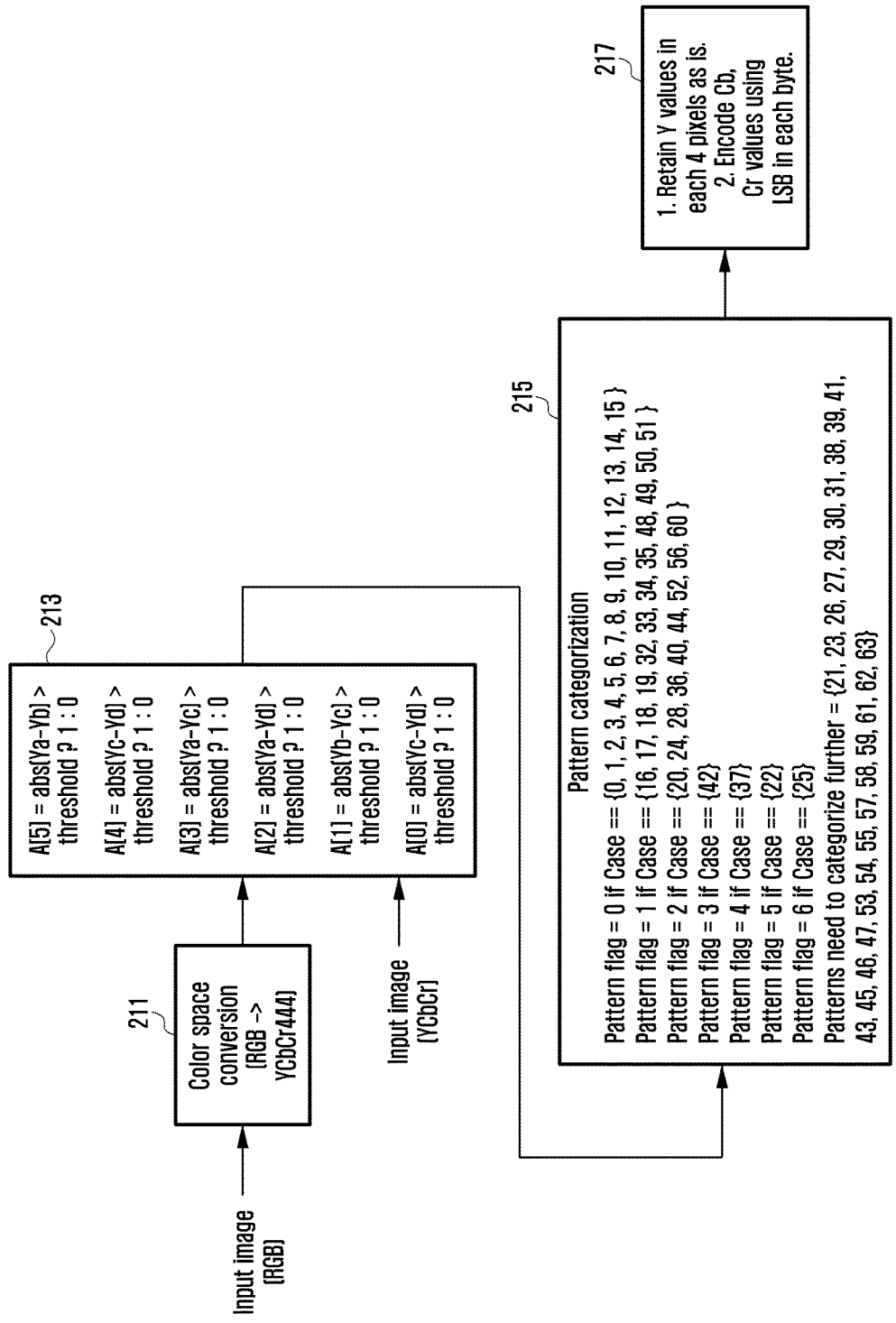
FIG. 5 is a block diagram of an image-processing module for analyzing values of pixels in a unit block, determining the pixel pattern based on the pixel analyses, and encoding color difference data according to the determined pixel pattern in an electronic device according to various embodiments of the present invention.

FIG. 5 is a block diagram of an image-processing module for analyzing values of pixels in a unit block, determining the pixel pattern based on the pixel analyses, and encoding color difference data according to the determined pixel pattern in an electronic device according to various embodiments of the present invention.

Referring to FIG. 5, the input may be an RGB image or a YCbCr image. When an RGB image is input, a color space conversion module 211 converts the RGB image into a YCbCr image. To this end, the color space conversion module 211 performs color space conversion based on the following Equation 1).

$$Y = 0.29900*R + 0.58700*G + 0.11400*B$$

$$Cb = 0.16874*R + 0.33126*G + 0.50000*B$$

$$Cr = 0.50000*R + 0.41869*G + 0.08131*B \qquad (1)$$

Figure 6:
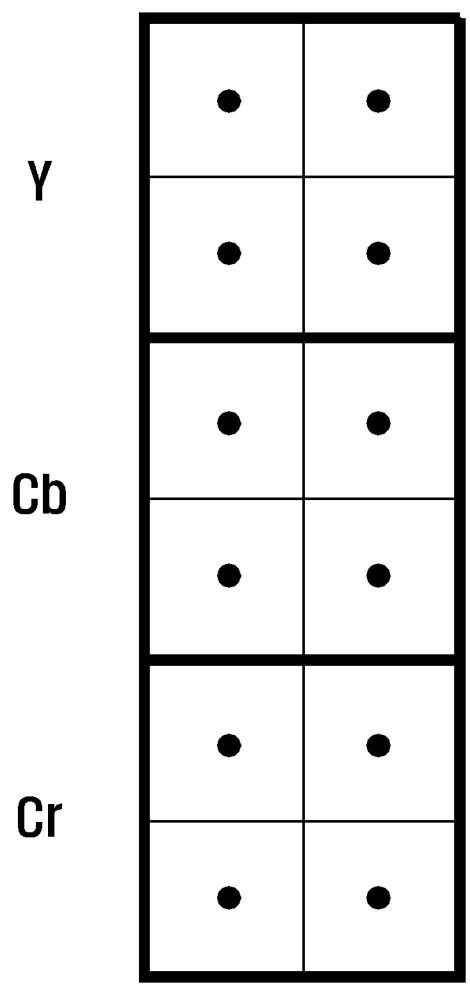
FIG. 6 illustrates a configuration of pixels in a unit block in an electronic device according to various embodiments of the present invention.

The color space conversion module 211 performs color conversion from the RGB image into a YCbCr image of 4:4:4 resolution, as shown in FIG. 6.

FIG. 6 illustrates a configuration of pixels in a unit block of a YCbCr image by a color space conversion module 211 in an electronic device according to various embodiments of the present invention. A YCbCr image of 4:4:4 resolution has a mapping structure with Y, Cb and Cr pixels in a unit block (e.g., 4 pixels). The color space conversion module 211 analyzes values of Y, Cb and Cr pixels based on a unit block, determines a pixel pattern, and encodes pixels according to the pixel pattern. During the process, since the Y most affects the recovery of the image, it is preferable that the pixel size remains unchanged in an encoding process. In addition, pixels of a unit block for analyzing pixel values may use the Y pixel.

Referring back to FIG. 5, the pixel analysis module 213 analyzes pixel values of a unit block by using YCbCr images output from or input to the color space conversion module 211.

Figure 7A:
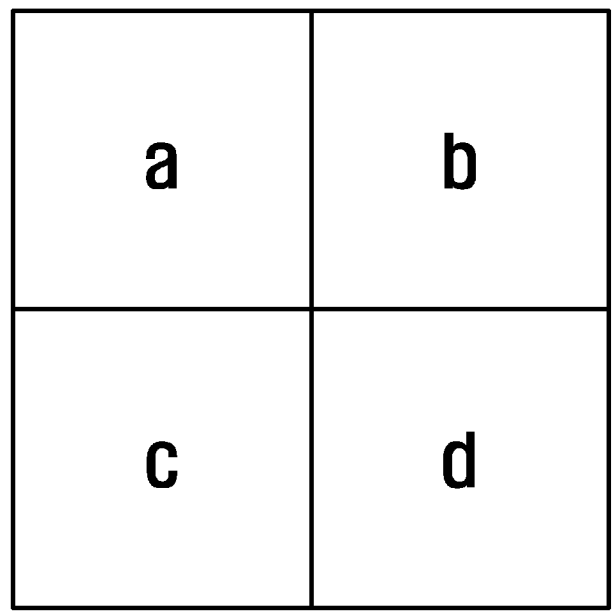
Figure 7B:
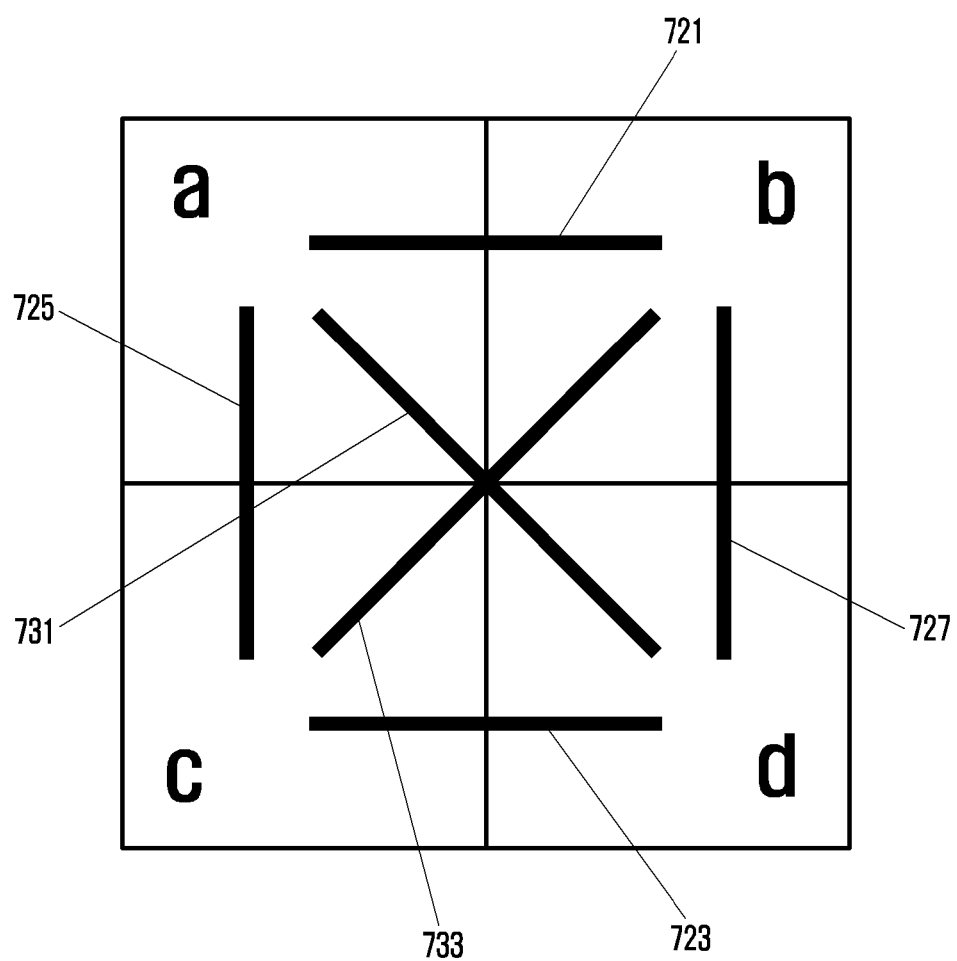
Figure 7C:
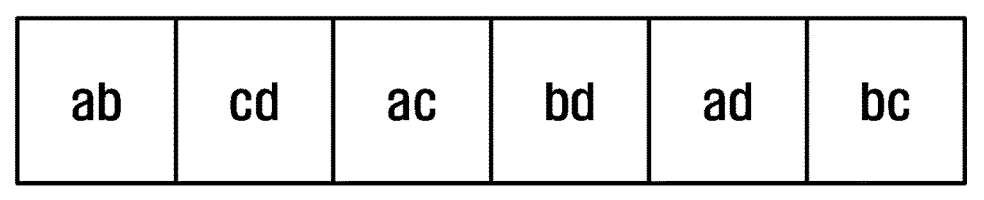

FIGS. 7A to 7C illustrate a process of analyzing pixel values of a unit block in an electronic device according to various embodiments of the present invention.

FIG. 7A illustrates an arrangement of pixels in a unit block, and may be a configuration of a unit block of luminance pixels. FIG. 7B illustrates a method of operating pixels of a unit block shown in FIG. 7A by the pixel analysis module 213 illustrated in FIG. 5.

For pixels a and b indicated by reference numeral 721 in FIG. 7B, the pixel analysis module 213 calculates a difference between values of pixels a and b, compares the absolute value of the difference with a threshold, and outputs the comparison result as '0' or '1.' For pixels c and d indicated by reference numeral 723 in FIG. 7B, the pixel analysis module 213 calculates a difference between values of pixels c and d, compares the absolute value of the difference with a threshold, and outputs the comparison result as '0' or '1.' For pixels a and c indicated by reference numeral 725 in FIG. 7B, the pixel analysis module 213 calculates a difference between values of pixels a and c, compares the absolute value of the difference with a threshold, and outputs the comparison result as '0' or '1.' For pixels b and d indicated by reference numeral 727, the pixel analysis module 213 calculates a difference between values of pixels b and d, compares the absolute value of the difference with a threshold, and outputs the comparison result as '0' or '1.' For pixels a and d indicated by reference numeral 731, the pixel analysis module 213 calculates a difference between values of pixels a and d, compares the absolute value of the difference with a threshold, and outputs the comparison result as '0' or '1.' For pixels b and c indicated by reference numeral 733, the pixel analysis module 213 calculates a difference between values of pixels b and c, compares the absolute value of the difference with a threshold, and outputs the comparison result as '0' or '1.'

The pixel analysis module 213 includes six absolute value calculators and the corresponding comparators. Each of the absolute value calculators may use same threshold, and according to another embodiment, the thresholds of the each of the absolute value calculators may be different from each other. The absolute value calculators and the corresponding comparators analyze pixel data of the respective pixels based on the following Equation (2) and output the pixel data as shown in FIG. 7C.

$$Abs(Ya-Yb) > \text{threshold value}$$

$$Abs(Yc-Yd) > \text{threshold value}$$

$$Abs(Ya-Yc) > \text{threshold value}$$

$$Abs(Yb-Yd) > \text{threshold value}$$

$$Abs(Ya-Yd) > \text{threshold value}$$

$$Abs(Yb-Yc) > \text{threshold value} \qquad (2)$$

The analyzed pixel data calculated by Equation (2) has a data structure of 6 bits shown in FIG. 7.

Figure 8:
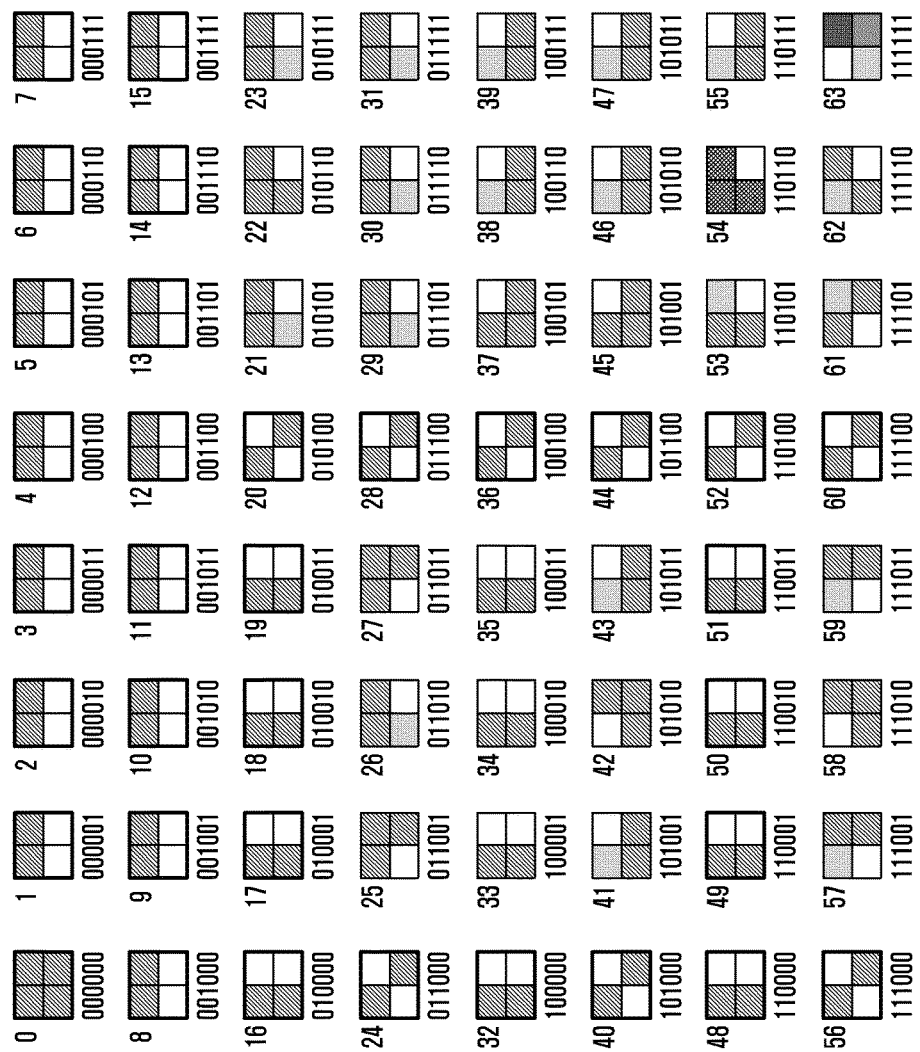
FIG. 8 illustrates patterns of a unit block according to analyzed pixel data in an electronic device according to various embodiments of the present invention.

FIG. 8 illustrates examples of pattern categorization corresponding to analyzed pixel data of 6 bits output from the pixel analysis module 213. As shown in FIG. 8, although values of analyzed pixel data differ from each other, their patterns are identical to each other. For example, pattern 0 of the patterns shown in FIG. 4 is created when analyzed pixel data are 0, 1, 2, 3, 4, 5, 6, 7, 8, 9, 10, 11, 12, 13, 14, and 15. Pattern 1 is created when analyzed pixel data are 16, 17, 18, 19, 32, 33, 34, 35, 48, 49, 50, and 51. Pattern 2 is created when analyzed pixel data are 20, 24, 28, 36, 40, 44, 52, 56, and 60. In addition, when pixel data of a unit block are 21, 23, 26, 27, 29, 30, 31, 38, 39, 41, 43, 45, 46, 47, 53, 54, 55, 58, 59, 51, 62, and 63, the pixel data is classified as the other patterns except of Patterns 0, 1, and 2 shown in FIG. 4.

Referring back to FIG. 5, the pattern-determining module 215 determines a pixel pattern of a unit block by using analyzed pixel data output from the pixel analysis module 213. When values of analyzed pixel data differ from each other but their pixel pattern has the same structure, the pixel data is determined as having the same flag data because when the color difference data is encoded, the encoded data can be stored along with the pattern information.

For example, when the analyzed pixel data are 0, 1, 2, 3, 4, 5, 6, 7, 8, 9, 10, 11, 12, 13, 14, and 15, the data can be set as the flag data of the same value. To this end, the storage 220 includes a flag table where values of analyzed pixel data are mapped to pixel patterns as shown in FIG. 8. When the analyzed pixel data is entered, the pattern-determining module 215 determines flag data of a pixel pattern corresponding to the analyzed pixel data. The flag data may be determined to have a size of 4 bits. In that case, the number of pixel patterns of a unit block may be 16. Although the embodiment is described based on the flag data of 4 bits, it should be understood that the size of flag data may increase when the pixel pattern is subdivided.

The encoding module 217 encodes color difference data according to the determined pixel pattern, and creates encoded data including the encoded color difference data, luminance data and flag data. The encoding module 217 includes a color difference encoding unit for encoding color difference data CB and CR of a unit block corresponding to the pixel patterns, a flag inserting unit for inserting flag data to the encoded color difference data, and a combination unit for combining the encoded color difference data and the luminance data of a unit block.

The encoding module 217 encodes color difference data according to the determined pixel pattern. The process of encoding color difference data may be performed based on a unit block. For example, if a unit block is formed with four pixels, the encoding module 217 encodes color difference pixel of four pixels, Cba–Cbd and Cra–Crd, to color difference pixel of two pixels, CB1–CB2 and CR1–CR2. This encoding scheme takes the averages of pixel values of the same patter and then creates encoded color difference data. For example, when pixels have pattern 0, the flag data is "0000."

The encoding module 217 calculates the average of color difference pixels Cba and Cbb and the average of color difference pixels, Cra and Crb, and creates the encoded color difference data CB1 and CR1, respectively. The encoding module 217 also calculates the average of color difference pixels Cbc and Cbd and the average of color difference pixels, Crc and Crd, and creates the encoded color difference data CB2 and CR2, respectively. Flag data is then inserted into the encoded color difference data CB1–CB2 and CR1–CR2. In that case, the color difference data may be configured as shown in the following Table 1.

TABLE 1

|    | b7          | b6          | b5          | b4         | b3          | b2          | b1          | b0     |
|----|-------------|-------------|-------------|------------|-------------|-------------|-------------|--------|
| B1 | (a7 + b7)/2 | (a6 + b6)/2 | (a5 + b5)/2 | (a4 + b4)/2| (a3 + b3)/2 | (a2 + b2)/2 | (a1 + b1)/2 | Flag 3 |
| B2 | (c7 + d7)/2 | (c6 + d6)/2 | (c5 + d5)/2 | (c4 + d4)/2| (c3 + d3)/2 | (c2 + d2)/2 | (c1 + d1)/2 | Flag 2 |
| R1 | (a7 + b7)/2 | (a6 + b6)/2 | (a5 + b5)/2 | (a4 + b4)/2| (a3 + b3)/2 | (a2 + b2)/2 | (a1 + b1)/2 | Flag 1 |
| R2 | (c7 + d7)/2 | (c6 + d6)/2 | (c5 + d5)/2 | (c4 + d4)/2| (c3 + d3)/2 | (c2 + d2)/2 | (c1 + d1)/2 | Flag 0 |

FIGS. 9A to 9C illustrate a process of configuring encoded data of a unit block in an electronic device according to various embodiments of the present invention. Referring to FIG. 9A, the encoding module 217 creates encoded data by combining luminance data of a unit block and encoded color difference data CB and CR. FIGS. 9A to 9C illustrate configurations of encoded data of a unit block. The luminance data remains with pixel data of a unit block of 4 pixels, the encoded color difference data CB is converted to encoded color difference data of two pixels, CB1 and CB2, and encoded color difference data CR includes encoded color difference data of two pixels, CR1 and CR2. Flag data as pixel pattern information is inserted into the Least Significant Bit (LSB) of the encoded color difference data CB1–CB2 and CR1–CR2.

As shown in FIG. 9A, the controller 210 then stores an encoded image in the storage 220 illustrated in FIG. 2. The storage efficiency of the storage 220 may be enhanced by encoding the color difference data. The controller 210 transmits the images encoded as shown in FIGS. 9A to 9C to an external device through the communication unit 250 or another module. For example, the controller 210 includes a graphic processor that transmits the encoded image to the display 230. In that case, the transmission rate may be enhanced by encoding the image.

As shown in FIG. 9A, the encoded image may be created as color difference data are encoded, as a unit block, according to the pixel pattern. When the image includes outlines or boundaries of objects, the pixel pattern may be detected in various forms according to objects. The controller 210 determines a pixel pattern corresponding to the outlines or boundaries of objects in the image, and encodes color difference data according to the determined pixel pattern. When the controller 210 decodes an image formed with the structure shown in FIGS. 9A to 9C, the controller 210 verifies a pixel pattern according to flag data and decodes pixels according to the verified pixel pattern.

For example, when pattern flag is "0000," the controller 210 restores values of pixels a and b of a unit block to CB1 and CR1, and values of pixels c and d of a unit block to CB2 and CR2. When pattern flag is "0001," the controller 210 restores values of pixels a and c of a unit block to CB1 and CR1, and values of pixels b and d of a unit block to CB2 and CR2. The controller 210 decodes the color difference data of a unit block to data of 4 pixels by using the encoded color difference data that correspond to the pixel patterns respectively.

When the loss of the quality of image is imperceptible (i.e., visually lossless), part of the luminance data, such as the LSB, is also used to store additional information. Unlike the configuration shown FIG. 9A, as shown in FIGS. 9B and 9C, additional information may be stored in part of color difference data and luminance data.

Referring to FIG. 9B, flag data may be stored in the LSB location of the color difference data and luminance data. The storage order of bits does not need to be the order shown in FIG. 9B. That is, the encoder for analyzing a pixel pattern and ad the decoder for decoding the pattern may store data in a storage order of bits that are preset as a rule.

FIG. 9C illustrates a structure of encoded data that is identical to that of FIG. 9B except that the order of bits differs from that of FIG. 9B. The flags between FIG. 9C and FIG. 9B are identical to each other in that they replace LSB values of color difference data, but are different from each other in terms of their storage orders. Flags including pixel pattern information may be placed before every byte, as shown in FIG. 9C, or alternatively may all be placed before the entire bit sequence. This arrangement simplifies the design of an encoder or decoder.

Figure 10:
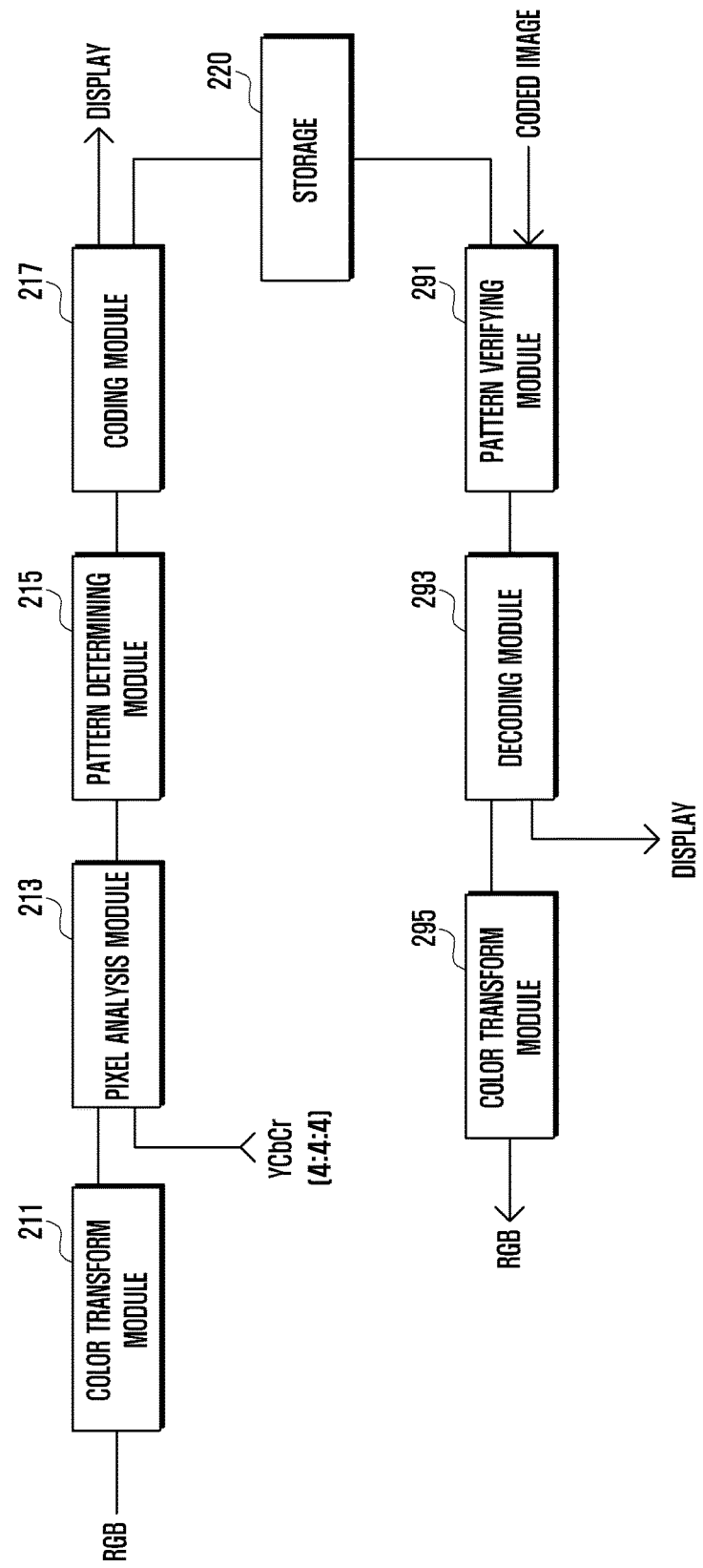
FIG. 10 illustrates a process of encoding and decoding images in an electronic device according to various embodiments of the present invention.

FIG. 10 illustrates a process of encoding and decoding images in an electronic device according to various embodiments of the present invention.

Referring to FIG. 10, the controller 210 includes the coder 217 for encoding an image or color images, and a decoder 293 for decoding the encoded images. The embodiment of FIG. 10 may be an image-processing module 170 shown in FIG. 1. The image-processing module 170 may be included in the controller 210 or may be configured as a separate component. The color image encoded or decoded may be a YCbCr image.

When the color space conversion module 211 receives an RGB image, the color space conversion module 211 coverts the RGB image to a YCbCr image with 4:4:4 resolution, such as by using Equation (1) or a conversion scheme set by the corresponding rule. The pixel analysis module 213 receives the 4:4:4 YCbCr image from the color space conversion module 211 or a 4:4:4 YCbCr image directly from outside the space conversion module 211.

The pixel analysis module 213 analyzes luminance pixels of a unit block from the 4:4:4 YCbCr image and outputs the analyzed pixel data. The pixel analysis module 213 obtains a difference of pixels ab, cd, ac, bd, ad, and be (4C2=6) from luminance pixels of 4 pixels (a–d), compares the absolute values of the differences with a threshold, and outputs the comparison results as analyzed pixel data. The analyzed pixel data may be data of 6 bits.

The pattern-determining module 215 analyzes the analyzed pixel data and determines a pixel pattern. For example, the storage 220 includes a flag table for pixel patterns corresponding to the analyzed pixel data. When the storage 220 receives the analyzed pixel data, the storage 220 determines flag data of the corresponding pixel pattern from the flag table.

The encoding module 217 creates encoded color difference data CB1–CB2 and CR1–CR2 of color difference data Cb and Cr according to the determined pixel pattern. The encoded color difference data CB1–CB2 and CR1–CR2 is used to calculate an average of pixels that have similar pixel values according to pixel patterns and the average may be determined as the encoded color difference data. The flag data determined by the pattern-determining module 215 is inserted to a lower bit of the encoded color difference data. The encoding module 217 then combines the encoded color difference data (including flag data) and corresponding luminance data of a unit block, and creates the last encoded data as shown in FIGS. 9A to 9C. The encoding module 217 outputs the last encoded data to other modules or external devices through the communication unit 250. The encoding module 217 may also store the last encoded data in the storage 220.

The images encoded as illustrated in FIGS. 9A to 9C are displayed as follows. The controller 210 or the display 230 with a decoder decodes encoded images. In the following description, for the sake of convenience, the decoding process is explained based on the controller 210. The controller 210 accesses encoded images in the storage 220 or receives encoded images from other modules or external devices. When the pattern verifying module 291 receives the encoded image, the pattern verifying module 291 analyzes flag data from the encoded image shown in FIGS. 9A to 9C and verifies a pixel pattern.

The decoding module 293 decodes corresponding pixels according to the verified pixel pattern. The color difference data of the encoded image may be created as data of 4 pixels is encoded to 2 pixels. The decoding module 293 restores the encoded color difference data of 2 pixels to color difference data of 4 pixels. When the decoding module 293 decodes color difference data Cb and Cr, the decoding module 293 decodes 4 pixel values according to pixel patterns. For example, when an encoded image is pattern 0, the decoding module 293 restores Cba and Cbb pixels to encoded CB1 data, Cbc and Cbd pixels to encoded CB2 data, Cra and Crb pixels to encoded CR1 data, and Crc and Crd pixels to encoded CR2 data. When an encoded image is pattern 1, the decoding module 293 restores Cba and Cbc pixels to encoded CB1 data, Cbb and Cbd pixels to encoded CB2 data, Cra and Crc pixels to encoded CR1 data, and Crb and Crd pixels to encoded CR2 data.

The decoded YCbCr image may be displayed on the display 230. In addition, when the YCbCr image is converted to an RGB image, the color space conversion module 295 converts the YCbCr image to an RGB image based on the following Equation (3).

$$R = Y + 1.402 * Cr$$

$$G = Y - 0.334 * Cb - 0.713 * Cr$$

$$B = Y + 1.772 * Cr \qquad (3)$$

As described above, the electronic device according to various embodiments of the present invention performs analysis based on luminance data of an image and encodes color difference data, while maintaining the luminance data. The electronic device according to various embodiments analyzes luminance data of an image along with color difference data, or performs analysis in linear combination with weights. When the loss of the quality of image by luminance data is imperceptible (i.e., visually lossless), the luminance data may be also included in objects to be encoded. When image data is encoded by combining the luminance data and color difference data or by using color difference data, patterns that are from among the combinations shown in FIG. 8 but do not correspond to patterns shown in FIG. 4 may be encoded.

Figure 11:
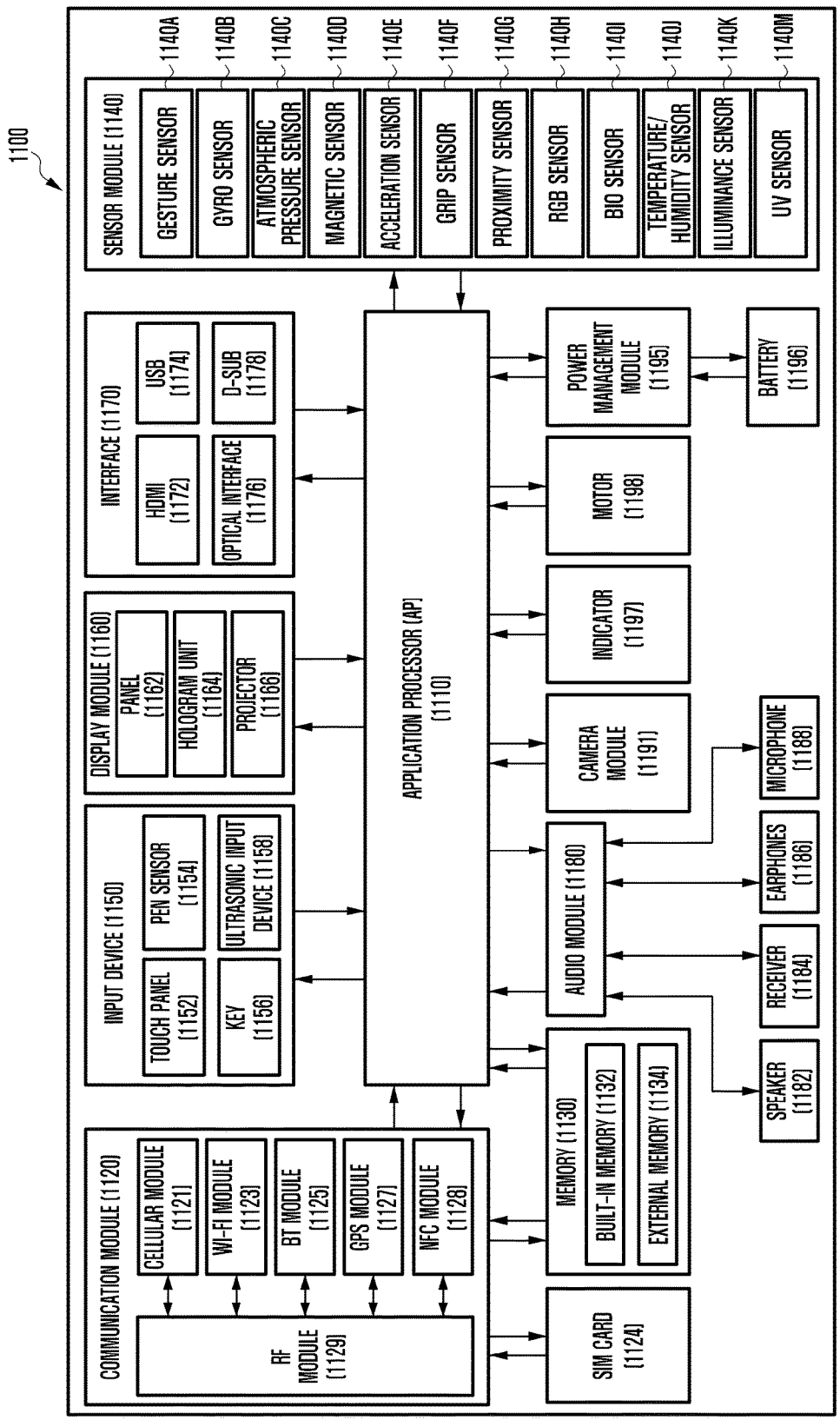
FIG. 11 is a schematic block diagram of an electronic device according to various embodiments of the present invention.

FIG. 11 is a block diagram of an electronic device according to various embodiments of the present invention.

The electronic device 1101 configures all or a part of the electronic device 101 illustrated in FIG. 1. Referring to FIG. 11, the electronic device 1101 includes one or more Application Processors (APs) 1110, a communication module 1120, a Subscriber Identification Module (SIM) card 1124, a memory 1130, a sensor module 1140, an input device 1150, a display module 1160, an interface 1170, an audio module 1180, a camera module 1191, a power-managing module 1195, a battery 1196, an indicator 1197, and a motor 1198.

The AP 1110 operates an Operating System (OS) or an application program so as to control a plurality of hardware or software component elements connected to the AP 1110 and executes various data processing and calculations including multimedia data. The AP 1110 may be implemented by a System on Chip (SoC). According to an embodiment, the processor 1110 may further include a Graphic Processing Unit (GPU).

The AP 1110 includes the image-processing module 170, the elements of FIG. 2 for encoding the color difference data according to the pixel pattern in a color image of 4:4:4 color resolution, and the elements of FIG. 10 for restoring the encoded color difference data according to the pixel pattern.

The communication module 1120 transmits/receives data in communication between different electronic devices such as the electronic device 104 and the server 106 connected to the electronic device 1101 through a network. In FIG. 11, the communication module 1120 includes a cellular module 1121, a WiFi module 1123, a BlueTooth® (BT) module 1125, a GPS module 1127, a Near Field Communication (NFC) module 1128, and a Radio Frequency (RF) module 1129.

The cellular module 1121 provides a voice, a call, a video call, SMS, or an Internet service through a communication network. The cellular module 1121 distinguishes and authenticates electronic devices within a communication network by using a Subscriber Identification Module (SIM card 1124). According to an embodiment, the cellular module 1121 performs at least some of the functions that can be provided by the AP 1110, such as the multimedia control functions.

According to an embodiment, the cellular module 1121 includes a Communication Processor (CP). The cellular module 1121 may be implemented by, for example, an SoC. Although the components such as the cellular module 1121, the memory 1130, and the power-managing module 1195 are illustrated as components separate from the AP 1110 in FIG. 11, the AP 1110 includes at least some of the aforementioned components. According to an embodiment, the AP 1110 or the cellular module 1121 loads a command or data received from at least one of a non-volatile memory and other components connected to each of the AP 1110 and the cellular module 1121 to a volatile memory and processes the loaded command or data. The AP 1110 or the cellular module 1121 stores data received from at least one of other components or generated by at least one of other components in a non-volatile memory.

Each of the WiFi module 1123, the BT module 1125, the GPS module 1127, and the NFC module 1128 includes, for example, a processor for processing data transmitted/received through the corresponding module. Although the cellular module 1121, the WiFi module 1123, the BT module 1125, the GPS module 1127, and the NFC module 1128 are illustrated as blocks separate from each other in FIG. 9, at least two of the cellular module 1121, the WiFi module 1123, the BT module 1125, the GPS module 1127, and the NFC module 1128 may be included in one Integrated Chip (IC) or one IC package according to one embodiment. For example, at least some of the processors corresponding to the cellular module 1121, the WiFi module 1123, the BT module 1125, the GPS module 1127, and the NFC module 1128 may be implemented by one SoC.

The RF module 1129 transmits/receives data such as an RF signal. The RF module 1129 includes, for example, a transceiver, a Power Amp Module (PAM), a frequency filter, and a Low Noise Amplifier (LNA). The RF module 1129 may further include a component for transmitting/receiving electronic waves over a free air space in wireless communication, such as a conductor or a conducting wire. Although the cellular module 1121, the WiFi module 1123, the BT module 1125, the GPS module 1127, and the NFC module 1128 share one RF module 1129 in FIG. 11, at least one of the modules may transmit/receive an RF signal through a separate RF module according to one embodiment.

The SIM card 1124 is inserted into a slot formed in a particular portion of the electronic device, and includes unique identification information such as an Integrated Circuit Card IDentifier (ICCID) or subscriber information such as an International Mobile Subscriber Identity (IMSI).

The memory 1130 includes an internal memory 1132 or an external memory 1134. The internal memory 1132 includes, for example, at least one of a volatile memory such as a Random Access Memory (RAM), a dynamic RAM (DRAM), a static RAM (SRAM), and a synchronous dynamic RAM (SDRAM), and a non-volatile Memory such as a Read Only Memory (ROM), a One-Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory.

According to an embodiment, the internal memory 1132 may be a Solid State Drive (SSD). The external memory 1134 may further include a flash drive such as a Compact Flash (CF), a Secure Digital (SD), a Micro Secure Digital (Micro-SD), a Mini Secure Digital (Mini-SD), an extreme Digital (xD), or a memory stick. The external memory 1134 may be functionally connected to the electronic device 1101 through various interfaces. According to an embodiment, the electronic device 1101 may further include a storage device such as a hard drive.

The sensor module 1140 measures a physical quantity or detects an operation state of the electronic device 101, and converts the measured or detected information to an electronic signal. The sensor module 1140 includes a gesture sensor 1140A, a gyro sensor 1140B, an atmospheric pressure (barometric) sensor 1140C, a magnetic sensor 1140D, an acceleration sensor 1140E, a grip sensor 1140F, a proximity sensor 1140G, a color sensor 1140H (for example, Red, Green, and Blue (RGB) sensor) 1140H, a biometric sensor 1140I, a temperature/humidity sensor 1140J, an illumination (light) sensor 1140K, and a Ultra Violet (UV) sensor 1140M.

Additionally or alternatively, the sensor module 1140 may include an E-nose sensor, an Electromyography (EMG) sensor, an Electroencephalogram (EEG) sensor, an Electrocardiogram (ECG) sensor, an InfraRed (IR) sensor, an iris sensor, and a fingerprint sensor (not illustrated). The sensor module 1140 may further include a control circuit for controlling one or more sensors included in the sensor module 1140.

The input device 1150 includes a touch panel 1152, a (digital) pen sensor 1154, a key 1156, and an ultrasonic input device 1158. For example, the touch panel 1152 recognizes a touch input in at least one of a capacitive, resistive, infrared, and acoustic wave type. The touch panel 1152 may further include a control circuit. In the capacitive type, the touch panel 1152 can recognize proximity as well as a direct touch. The touch panel 1152 may further include a tactile layer that provides a tactile reaction to the user.

The (digital) pen sensor 1154 may be implemented, for example, using a method identical or similar to a method of receiving a touch input of the user, or using a separate recognition sheet. The key 1156 includes, for example, a physical button, an optical key, or a key pad. The ultrasonic input device 1158 detects an acoustic wave by a microphone 1188 of the electronic device 1101 through an input means generating an ultrasonic signal to identify data and performs wireless recognition.

According to an embodiment, the electronic device 1101 receives a user input from an external device connected to the electronic device 1101 by using the communication module 1120.

The display module 1160 includes a panel 1162, a hologram unit 1164, and a projector 1166. The panel 1162 may be, for example, a Liquid Crystal Display (LCD) or an Active Matrix Organic Light Emitting Diode (AM-OLED), and is implemented to be flexible, transparent, or wearable. The panel 1162 may be configured by the touch panel 1152 and one module. The hologram unit 1164 projects a stereoscopic image in the air by using interference of light. The projector 1166 projects light on a screen to display an image, wherein the screen may be located inside or outside the electronic device 1101. According to an embodiment, the display 1160 may further include a control circuit for controlling the panel 1162, the hologram unit 1164, and the projector 1166.

The interface 1170 includes, for example, a High-Definition Multimedia Interface (HDMI) 1172, a Universal Serial Bus (USB) 1174, an optical interface 1176, and a D-subminiature (D-sub) 1178, and is included in the communication interface 160 illustrated in FIG. 1. Additionally or alternatively, the interface 1190 may include a Mobile High-definition Link (MHL) interface, a Secure Digital (SD) card/Multi-Media Card (MMC), or an Infrared Data Association (IrDA) standard interface.

The audio module 1180 bi-directionally converts a sound and an electronic signal. At least some components of the audio module 1180 may be included in the input/output interface 140 illustrated in FIG. 1. The audio module 1180 processes sound information input or output through, for example, a speaker 1182, receiver 1184, earphones 1186, or the microphone 1188.

The camera module 1191 photographs a still image and video. According to an embodiment, the camera module 1191 includes one or more image sensors such as a front or back sensor, an Image Signal Processor (ISP) or a flash such as a Light-Emitting Diode (LED) or xenon lamp.

The power-managing module 1195 manages power of the electronic device 1101 and includes, for example, a Power Management Integrated Circuit (PMIC), a charger Integrated Circuit (IC), or a battery gauge.

The PMIC may be mounted to, for example, an integrated circuit or an SoC semiconductor. A charging method may be divided into wired and wireless methods. The charger IC charges a battery and prevents over voltage or over current from flowing from a charger. According to an embodiment, the charger IC includes a charger IC for at least one of the wired charging method and the wireless charging method. The wireless charging method includes, for example, a magnetic resonance method, a magnetic induction method and an electromagnetic wave method, and additional circuits for wireless charging may be added, such as a coil loop, a resonant circuit, or a rectifier.

The battery gauge measures a remaining quantity of the battery 1196, a voltage, a current, or a temperature during charging. The battery 1196 stores or generates electricity and supplies power to the electronic device 1101 by using the stored or generated electricity. The battery 1196 includes a rechargeable battery or a solar battery.

The indicator 1197 displays particular statuses of the electronic device 101 or a part of the electronic device 101, for example, a booting status, a message status, and a charging status.

The motor 1198 converts an electrical signal to a mechanical vibration. Although not illustrated, the electronic device 101 may include a GPU for supporting a module TV, such as media data according to a standard of Digital Multimedia Broadcasting (DMB), Digital Video Broadcasting (DVB), or media flow.

Each of the components of the electronic device according to various embodiments of the present invention may be implemented by one or more components and the name of the corresponding component may vary depending on a type of the electronic device. The electronic device according to various embodiments of the present invention includes all of, at least one of, or additional components to the above-described components. Some of the components of the electronic device may be combined to form a single entity, and thus may equivalently execute functions of the corresponding components before being combined.

The electronic device according to various embodiments of the present invention includes a controller for analyzing pixel data of an image, determining a pixel pattern, and encoding the image according to the determined pixel pattern, and a display, functionally connected to the controller, for displaying the image.

The pixel data includes luminance data, first color difference data and second color difference data. The controller analyzes one or more of luminance data, first color difference data and second color difference data, determines a pixel pattern based on the analysis, and re-configures the luminance data, first color difference data and second color difference data according to the determined pixel pattern.

The first color difference data is indicated by Cb and the second color difference data is indicated by Cr. The controller analyzes luminance pixel values of a preset unit block, determines a pixel pattern of the unit block, and encodes the Cb and Cr according to the determined pixel pattern.

The controller includes a pixel analysis unit for analyzing luminance pixel values of a unit block and outputting the analyzed pixel data, a pattern determining unit for determining a pixel pattern corresponding to the analyzed pixel data and outputting flag data of the determined pixel pattern, and an encoding unit for compressing and encoding Cb and Cr data to the determined pixel pattern and creating encoded data including the flag data, luminance data, and the compressed, encoded Cb and Cr data. When the image is RGB data, the controller includes a color space conversion unit for converting colors from RGB data to YCbCr data.

The pixel analysis unit includes a plurality of absolute value calculators for calculating absolute values Abs (Ya–Yb), Abs (Yc–Yd), Abs (Ya–Yc), Abs (Yb–Yd), Abs (Ya–Yd) and Abs (Yb–Yc) from Ya–Yd data forming unit data of luminance data, and a plurality of comparators for comparing the absolute values with a threshold and outputting analyzed pixel data.

The pattern determining unit analyzes the analyzed pixel data, determines a pixel pattern based on the analysis, and outputs flag data according to the determined pixel pattern.

The encoding unit includes a CB encoding unit for calculating an average of Cb pixels corresponding to a combination of pixels less than the threshold according to the determined pixel pattern, and creating first encoded data CB1 and second encoded data CB2, a Cr encoding unit for calculating an average of Cr pixels corresponding to a combination of pixels having values less than the threshold according to the determined pixel pattern, and creating first encoded data CR1 and second encoded data CR2, a flag inserting unit for inserting the flag data to CB1–CB2 and CR1–CR2, and a combination unit for combining Ya–Yd, CB1, CB2, CR1 and CR2 and flag data to create encoded data. The flag inserting unit inserts the flag data to the LSB of CB1, CB2, CR1 and CR2.

The controller further includes a pattern determining unit for analyzing, when displaying an image, flag data in an encoded image and verifying a pattern, a decoding unit for restoring first color difference data and second color difference data according to the verified pattern, and a color space conversion unit for converting, when the display is an RGB display, luminance data, first color difference data and second color difference data, output from the decoding unit, to RGB data.

Figure 12:
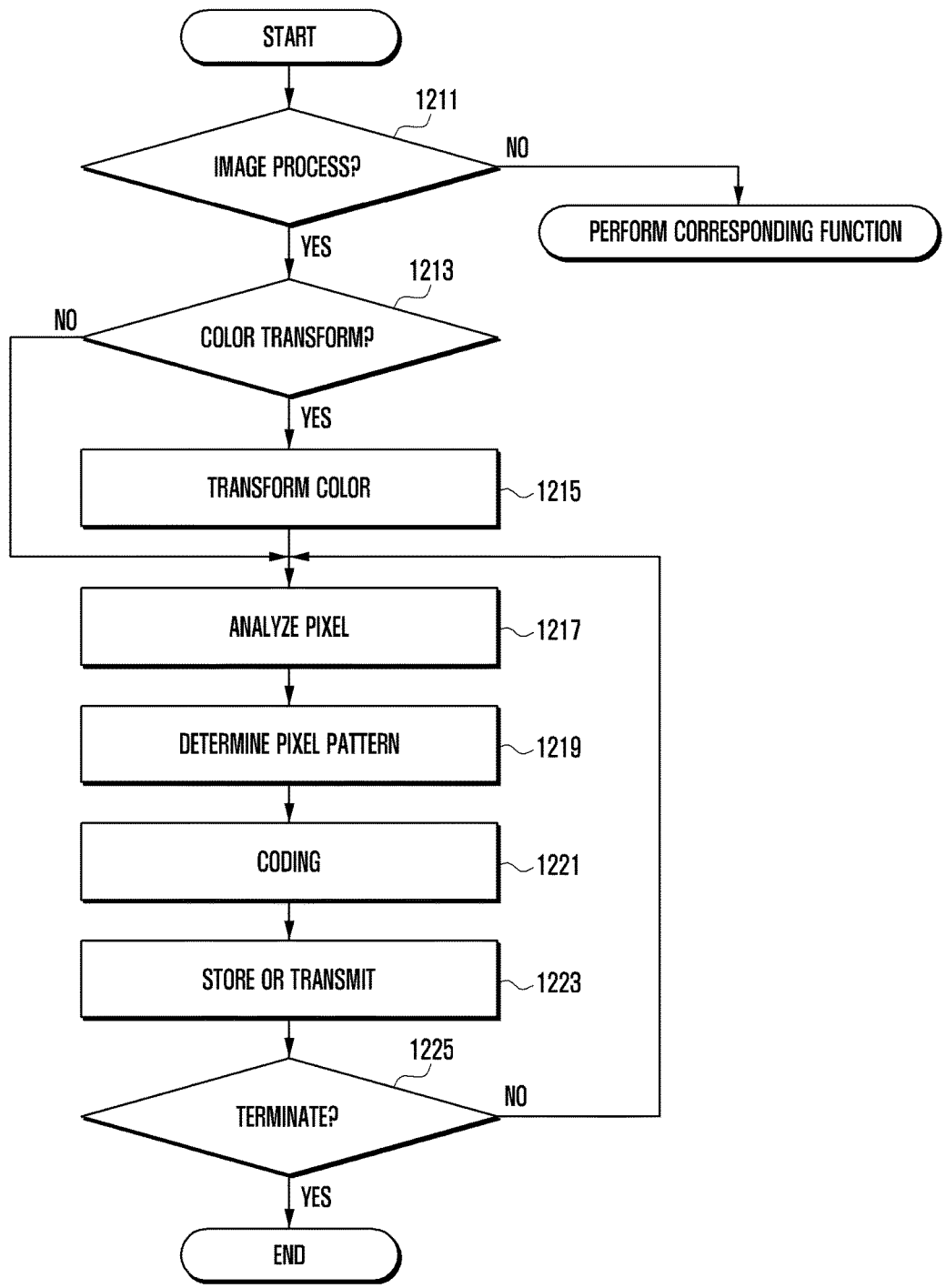
FIG. 12 illustrates a method of processing a color image in an electronic device according to various embodiments of the present invention.

FIG. 12 illustrates a method of processing a color image in an electronic device according to various embodiments of the present invention.

Referring to FIG. 12, when an image processing application is executed, the controller 210 detects the execution and performs an image processing function in step 1211, such as processing a color image of luminance data and color difference data. The image processing function may be for encoding color difference data of the color image of 4:4:4 resolution in a preset size. For example, the image is a YCbCr image and the image processing function is for encoding color difference data of 4 pixels to a color difference of 2 pixels. When the image is an RGB image, the controller 210 ascertains that the RGB image requires a color conversion in step 1213 and coverts the RGB image to an YCbCr image by using a scheme expressed by Equation (1) in step 1215.

The YCbCr image may be a color image of 4:4:4 resolution, which indicates that the pixels of luminance Y and color difference signals Cb and Cr have the same rate. The color resolution of 4:2:2 shown in FIG. 3B and the color resolution of 4:4:0 shown in FIG. 3C indicate that the respective rates of pixels of color difference signals Cb and Cr are half of those of luminance Y pixel. However, since color images where the rates of luminance data and color difference data differ from each other have the rates of pixels of color difference signals less than the rate of the luminance pixels, the color images may be displayed in a relatively low quality according to pixel patterns.

In order to encode color difference pixels with a rate that differs from that of luminance pixel, a method may be used that analyzes pixels in terms of a unit block, determines a pixel pattern of the unit block, and encodes pixels of color difference signals according to the determined pixel pattern. For example, the controller 210 encodes pixels of color difference signals according to a pixel pattern of a unit block, thereby reducing blur at the boundaries of an image displayed on the display 230 and displaying sharp boundaries.

The controller 210 analyzes specific data such as luminance data Y in a YCbCr image of 4:4:4 color resolution based on a unit block, creates analyzed pixel data, determines a pixel pattern of a unit block corresponding to the created, analyzed pixel data, and encodes color difference data according to the determined pixel pattern. The pixel pattern may be detected in different forms according to locations of an object in an image. For example, when the outline or boundary of an object is located widthwise, lengthwise, or diagonally, the pixel patterns in the unit block may be determined as different pattern categories. The remainder of the method of FIG. 12 will be provided in the description of FIGS. 13A-13B and 14-17, as follows.

Figure 13A:
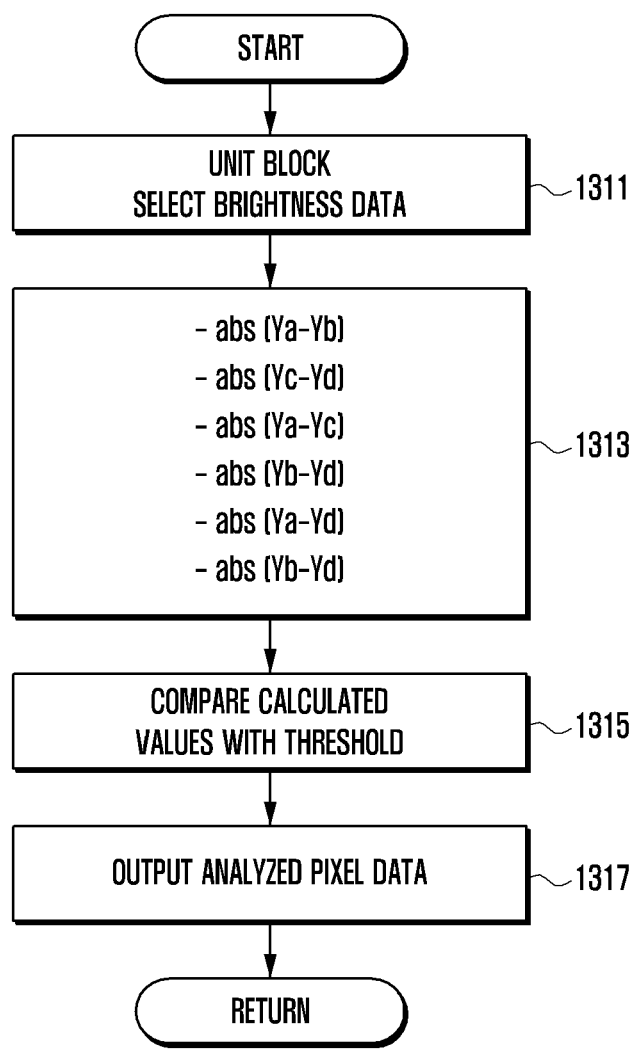
FIGS. 13A and 13B illustrate a method of analyzing pixel values in an electronic device according to various embodiments of the present invention.
Figure 13B:
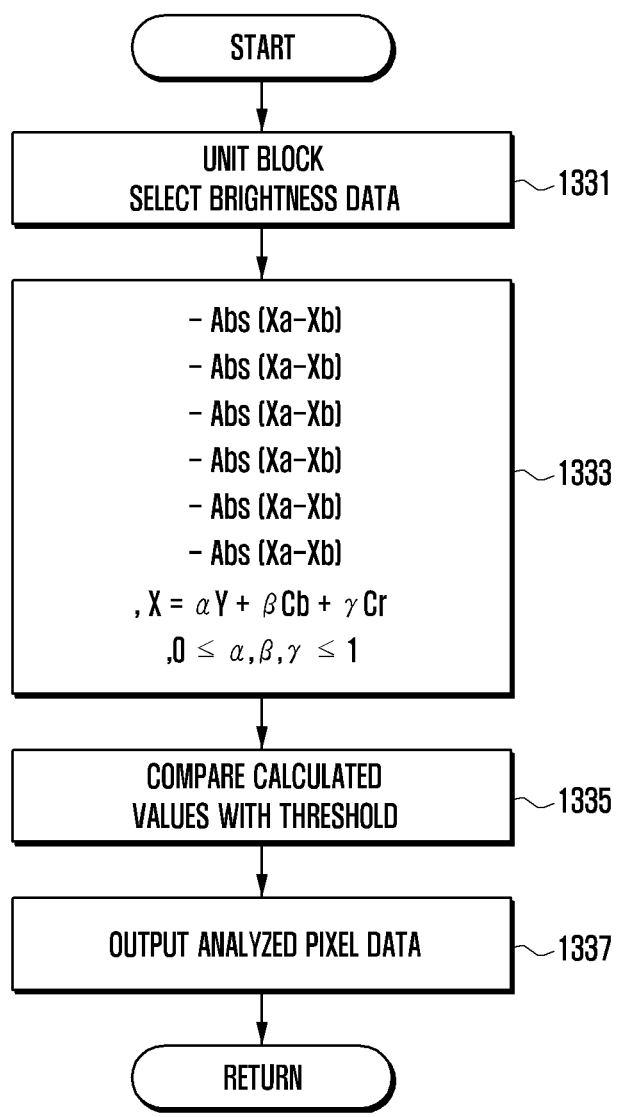

FIGS. 13A and 13B illustrate a method of analyzing pixel values in an electronic device according to various embodiments of the present invention.

Referring to FIG. 13A, a YCbCr image of 4:4:4 resolution has a structure where Y, Cb and Cb pixels are mapped with a size of a unit block (e.g., 4 pixels). The values of Y, Cb or Cb pixels are analyzed in a size of a unit block to determine a pixel pattern and then pixels are encoded according to the pixel pattern. During the process, since the Y mostly affects the recovery of an image, it is preferable that the pixel size remains the same size in an encoding process. When color difference information plays an important function according to image property or luminance information is restored to be visually lossless, part of the luminance (Y) image information may be used for the purpose of storing pattern information. In addition, pixels of a unit block to analyze pixel values may use Y pixels. The controller 210 selects luminance data of a unit block in order to determine a pixel pattern in step 1311.

The controller 210 operates values of luminance pixels in a unit block in step 1313. During this process, the pixel analysis module 213 analyzes pixel values of a unit block by using a YCbCr image output/input from/to the color space conversion module 211 shown in FIG. 6. The arrangement of luminance pixels in a unit block has a structure shown in FIG. 7A. The controller 210 operates values of luminance pixels in a unit block through the method shown in FIG. 7B.

The controller 210 calculates a difference between two pixel values in a unit block and the absolute value of the difference, by using Equation (2), in step 1313. The controller 210 compares the absolute value of the difference with a threshold in step 1315, and outputs the comparison result as '0' or '1' in step 1317. The analyzed pixel data calculated by using Equation (2) may be data of 6 bits with a structure shown in FIG. 7C.

Referring to FIG. 13B, the controller 210 selects luminance data of a unit block in order to determine a pixel pattern in step 1331, operates pixel values of luminance data and color difference data in step 1333, compares the calculated pixel values with corresponding thresholds respectively in step 1335, and outputs the analyzed pixel data in step 1337.

The pixel pattern may be analyzed based on the luminance pixel value as shown in FIG. 13A or by using the luminance pixel value and color difference pixel values as shown in FIG. 13B. For example, in the method shown in FIG. 13B, a pixel value may be determined considering luminance and color difference or based on a linear combination of luminance and color difference. The method shown in FIG. 13B may also be applied to the operation 213 shown in FIG. 5. Referring back to FIG. 12, the controller 210 analyzes pixel values by using the methods shown in FIGS. 13A and 13B in step 1217, and determines a pixel pattern corresponding to the analyzed pixel data in step 1219.

Figure 14:
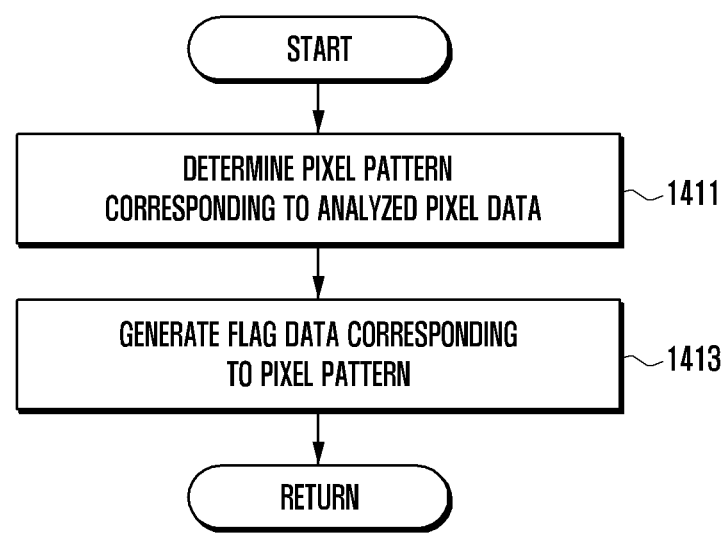
FIG. 14 illustrates a method of determining a pixel pattern in an electronic device according to various embodiments of the present invention.

FIG. 14 illustrates a method of determining a pixel pattern in an electronic device according to various embodiments of the present invention.

Referring to FIG. 14, although values of analyzed pixel data of 6 bits differ from each other, the pattern categorization has the identical pattern for the analyzed pixel data. For example, as shown in FIG. 4, pixel pattern 0 may be created when analyzed pixel data are 0, 1, 2, 3, 4, 5, 6, 7, 8, 9, 10, 11, 12, 13, 14, and 15, and pixel pattern 1 may be created when analyzed pixel data are 16, 17, 18, 19, 32, 33, 34, 35, 48, 49, 50, and 51. When analyzed pixel data have different values but an identical pixel pattern structure, the analyzed pixel data may be determined as identical flag data. To this end, the storage 220 includes a flag table for mapping between analyzed pixel data and pixel patterns.

When analyzed pixel data is created, the controller 210 determines a pixel pattern corresponding to the analyzed pixel data in step 1411, and generates flag data corresponding to the determined pixel pattern in step 1413. The flag data may be determined to be 4 bits in size. In that case, the number of pixel patterns of a unit block may be 16. Although the embodiment describes pixel patterns generated based on 4 bits of flag data, it should be understood that the size of flag data may increase when the pixel pattern is subdivided.

Referring back to FIG. 12, after generating the flag data, the controller 210 encodes color difference data according to the determined pixel pattern and creates encoded data including the encoded color difference data, luminance data and flag data in step 1221.

Figure 15:
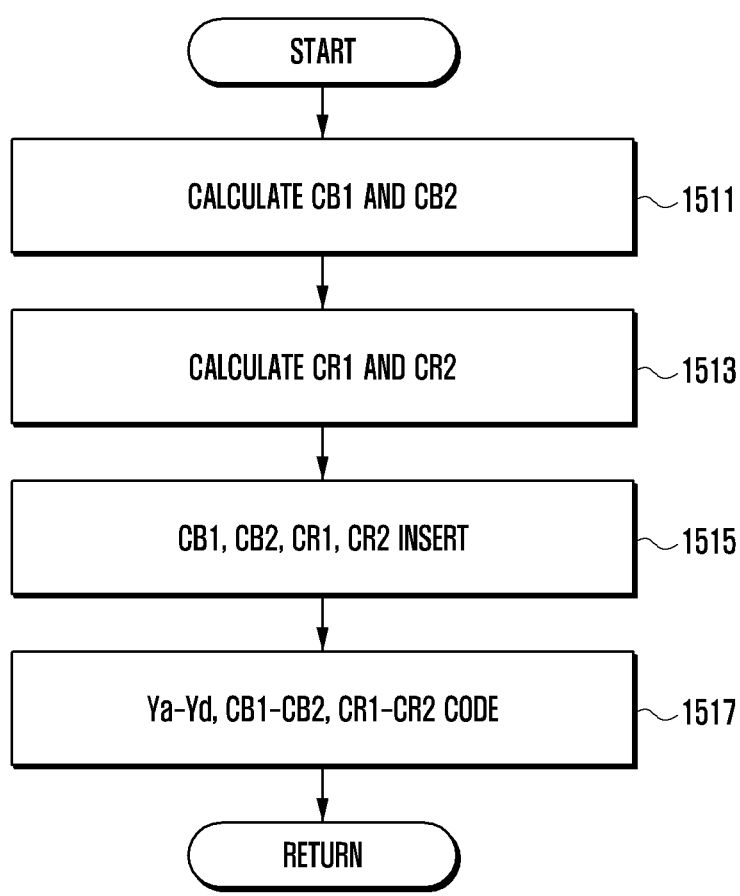
FIG. 15 illustrates a method of encoding images in an electronic device according to various embodiments of the present invention.

FIG. 15 illustrates a method of encoding images in an electronic device according to various embodiments of the present invention.

Referring to FIG. 15, the controller 210 encodes color difference data Cb and Cr according to the determined pixel pattern in steps 1511 and 1513. Specifically, the color difference data may be encoded, according to a pixel pattern, based on a unit block. For a unit block of 4 pixels, the controller 210 encodes color difference pixels of 4 pixels, Cba–Cbd, to color difference pixels of 2 pixels, CB1–CB2, according to a pixel pattern in step 1511. The controller 210 encodes color difference pixels of 4 pixels, Cra–Crd, to color difference pixels of 2 pixels, CR1–CR2, according to a pixel pattern in step 1513. The encoding method is performed in such a manner as to obtain an average of pixel values of the identical pattern and to create encoded color difference data from the average.

For example, for pattern 0, the controller 210 calculates an average of color difference pixels Cba and Cbb and the average of color difference pixels, Cra and Crb, and creates the encoded color difference data CB1 and CR1, respectively. The controller 210 may also calculate the average of color difference pixels Cbc and Cbd and the average of color difference pixels, Crc and Crd, and create the encoded color difference data CB2 and CR2, respectively. The controller 210 inserts flag data into the encoded color difference data CB1–CB2 and CR1–CR2 in step 1515, in which case the color difference data may be configured as shown in Table 1.

The controller 210 creates encoded data by combining luminance data of a unit block and encoded color difference data CB and CR in step 1517.

FIGS. 9A to 9C illustrate configurations of encoded data of a unit block. Referring back to FIG. 12, after creating the encoded data of structures shown in FIGS. 9A to 9C, the controller 210 stores the encoded image in the storage 220 or transmits the encoded image to other modules or external devices through the communication unit 250 in step 1223. The image processing operation is repeated until the image has been processed or a user's request for terminating the image process is made. When the controller 210 detects an image process termination in step 1225, the controller 210 terminates the image processing procedure.

The controller 210 determines a pixel pattern corresponding to outlines or boundaries of an object in the image, and creates an encoded image of color difference data encoded according to the determined pixel pattern. When the controller 210 decodes the encoded image, the controller 210 verifies a pixel pattern according to flag data and decodes the pixels according to the verified pixel pattern.

Figure 16:
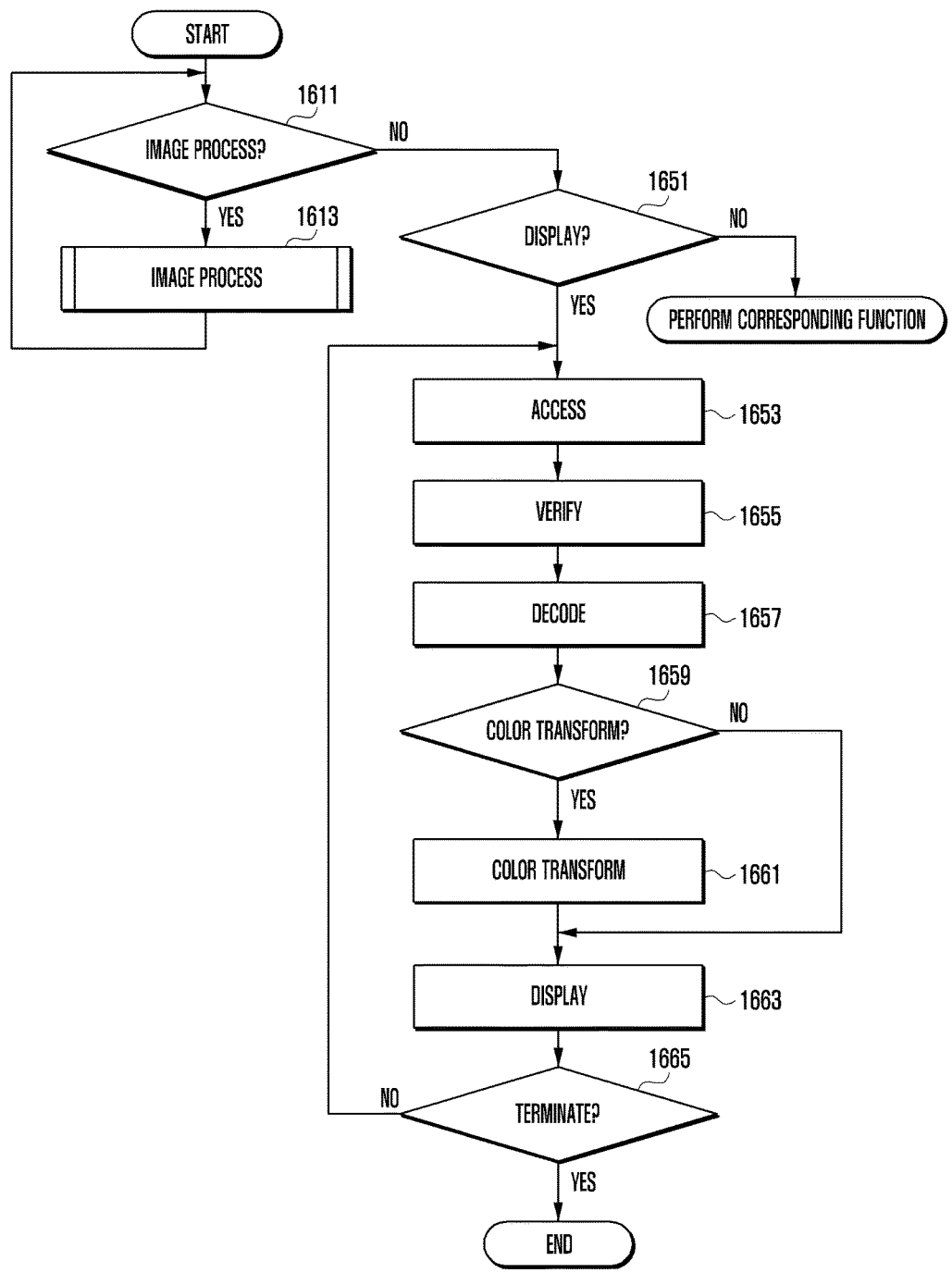
FIG. 16 illustrates a method of encoding images and decoding encoded images, according to pixel patterns, in an electronic device according to various embodiments of the present invention.

FIG. 16 illustrates a method of encoding images and decoding encoded images, according to pixel patterns, in an electronic device according to various embodiments of the present invention.

Referring to FIG. 16, when a function for encoding YCbCr image is executed, the controller 210 detects the encoding function in step 1611 and encodes a color image in step 1613. The process of encoding a color image in step 1613 may be performed according to the procedure shown in FIG. 12.

When a function of displaying the encoded image, the controller 210 detects the displaying function in step 1651, accesses an encoded image of one of the structures shown in FIGS. 9A to 9C in step 1653, verifies pattern flag to verify a pixel pattern in step 1655, and decodes the image according to the verified pixel pattern in step 1657.

Figure 17:
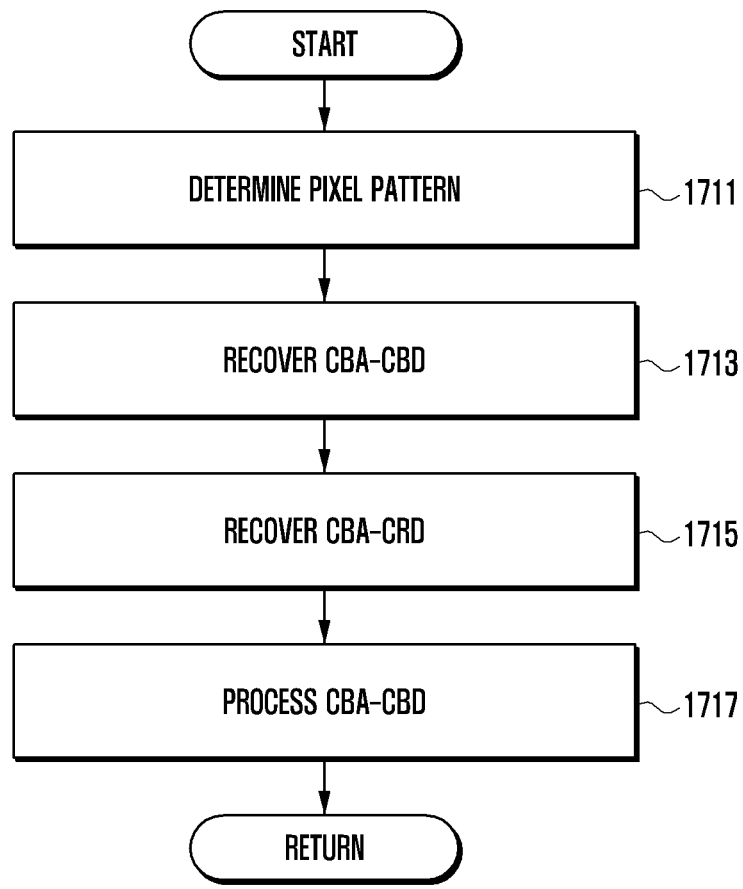
FIG. 17 illustrates a method of decoding a encoded image in an electronic device according to various embodiments of the present invention.

FIG. 17 illustrates a method of decoding a encoded image in an electronic device according to various embodiments of the present invention.

Referring to FIG. 17, the controller 210 determines a pixel pattern of a unit block corresponding to the flag data in step 1711, restores Cba–Cbd pixels by using CB1 and CB2 according to the verified pixel pattern in step 1713, and Cra–Crd pixels by using CR1 and CR2 according to the verified pixel pattern in step 1715. The controller 210 creates Ya–Yd of a unit block, decoded Cba–Cbd and Cra–Crd pixels in step 1717.

Referring back to FIG. 16, the controller 210 restores the color difference data of 2 pixels, decoded in step 1657, to color difference data of 4 pixels corresponding to a pixel pattern. For example, for an encoded image of pattern 0, the controller 210 restores Cba and Cbb pixels to CB1 data, Cbc and Cbd pixels to CB2 data, Cra and Crb pixels to CR1 data, and Crc and Crd pixels to CR2 data, in step 1657. In addition, for an encoded image of pattern 1, the controller 210 restores Cba and Cbc pixels to CB1 data, Cbb and Cbd pixels to CB2 data, Cra and Crc pixels to CR1 data, and Crb and Crd pixels to CR2 data.

When the display 230 displays RGB images, the controller 210 detects the displayed image in step 1659, performs color conversion for the YCbCr image by a method expressed by Equation (3), and displays the decoded YCbCr image on the display 230 in step 1663. When the controller 210 detects a termination in step 1665, the controller 210 terminates the encoding and decoding procedure.

Figure 18A:
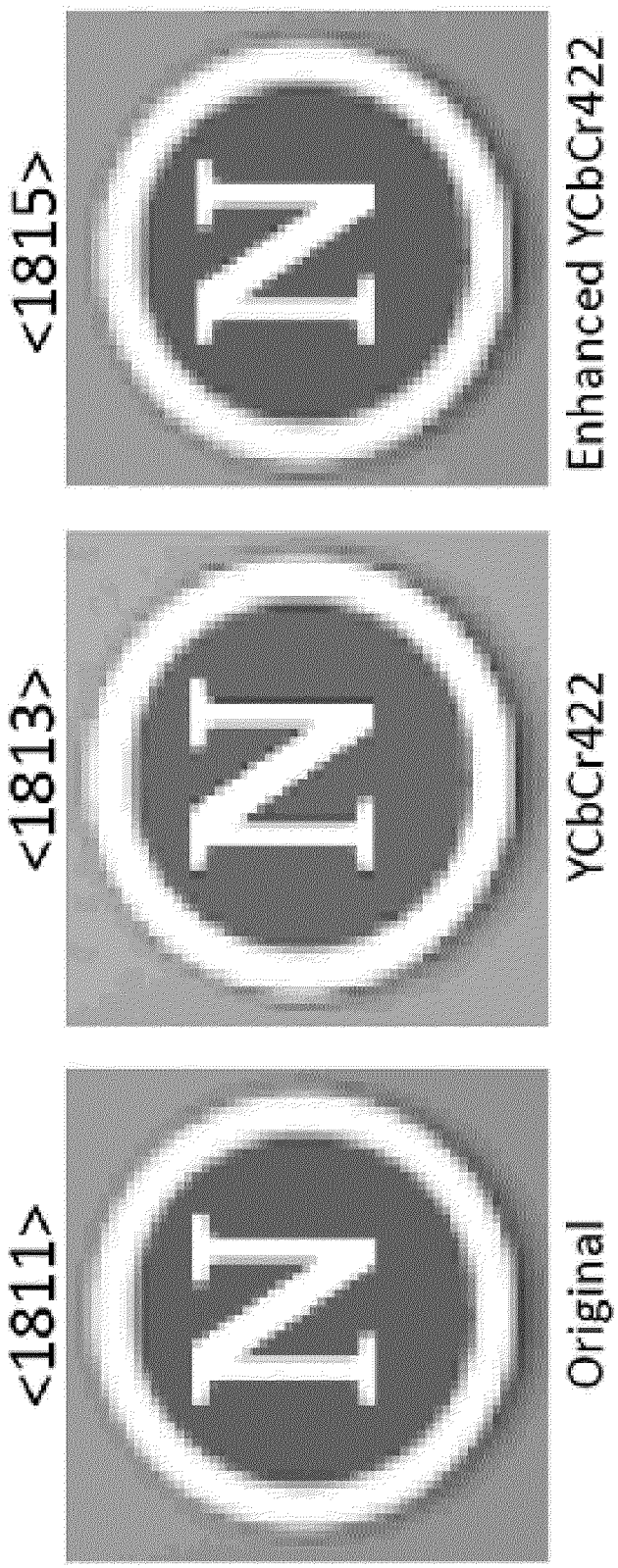
FIGS. 18A to 18C illustrate images encoded according to pixel patterns in an electronic device, by comparison with each other, according to various embodiments of the present invention.
Figure 18B:
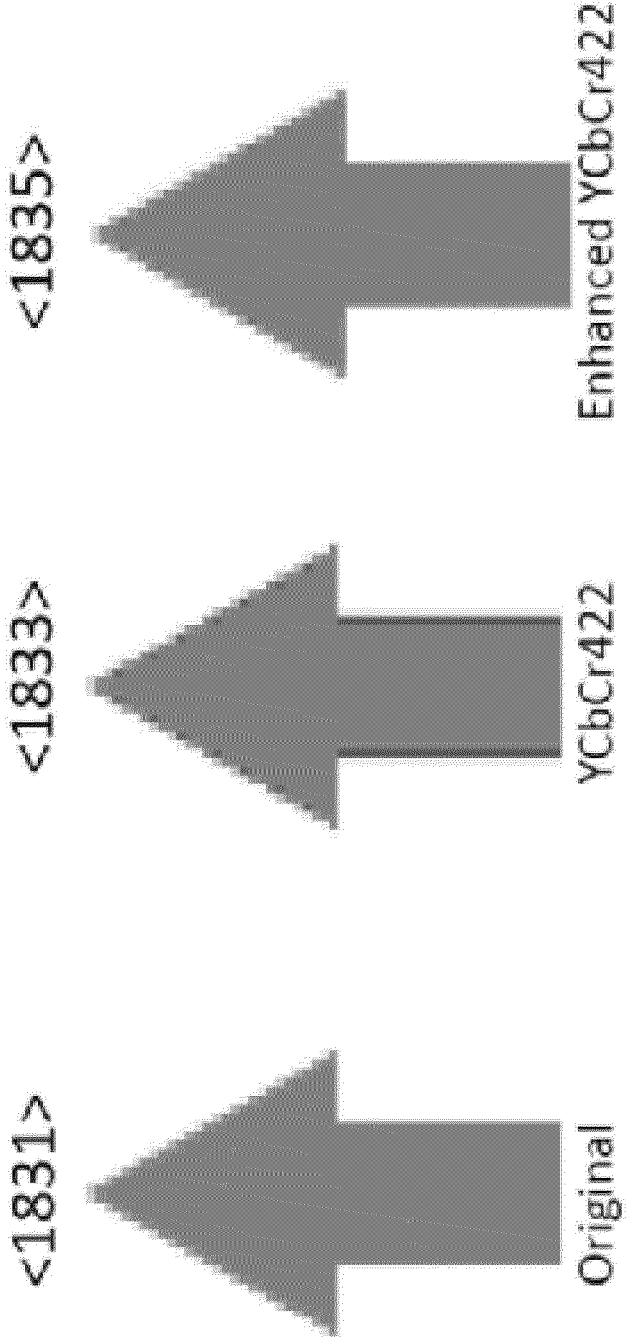
Figure 18C:
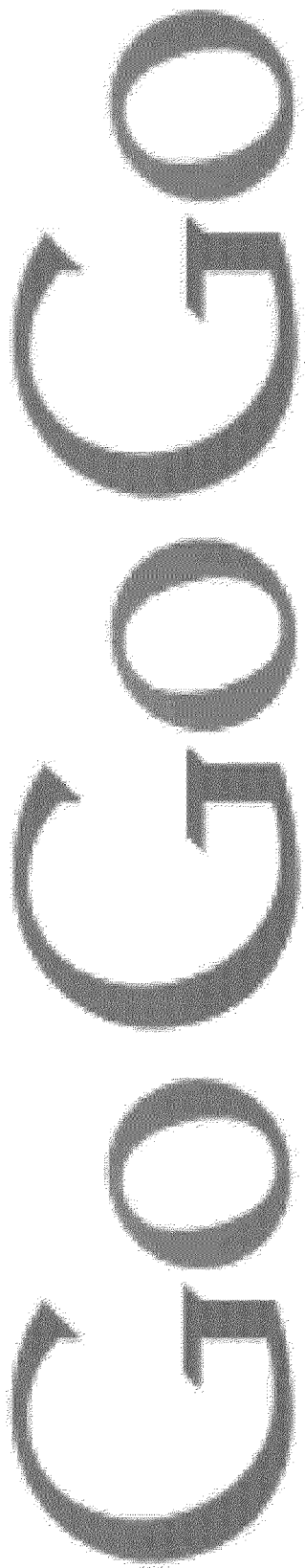

FIGS. 18A and 18B illustrate encoded images according to pixel patterns in an electronic device, by comparison with each other, according to various embodiments of the present invention. Referring to FIGS. 18A to 18C, the images indicated by reference numerals 1811, 1831 and 1851 are examples of an original image, images 1813, 1833 and 1853 are examples of a conventional YCbCR 422 image of color resolution 4:2:2, and images 1815, 1835 and 1855 are examples of an enhanced YCbCr 422 image as color difference data is encoded according to a pixel pattern. The enhanced YCbCr images 1815, 1835 and 1855 display objects with sharper boundaries and outlines than conventional YCbCR 422 images 1813, 1833 and 1853.

A method of processing images in an electronic device according to various embodiments of the present invention includes analyzing pixel data of an image and outputting the analyzed pixel data, determining a pixel pattern based on the analyzed pixel data, and encoding the image according to the determined pixel pattern.

The analyzed pixel data includes at least one of luminance data, first color difference data and second color difference data. The first color difference data is Cb. The second color difference data is Cr.

When the image is RGB data, the image processing method converts colors from the RGB data to YCbCr data.

The output of the analyzed pixel data includes selecting luminance pixels of a unit block, Ya and Yd, obtaining absolute values Abs (Ya–Yb), Abs (Yc–Yd), Abs (Ya–Yc), Abs (Yb–Yd), Abs (Ya–Yd) and Abs (Yb–Yc) from the Ya–Yd pixels, and comparing the absolute values with a threshold and outputting the analyzed pixel data.

The determination of a pixel pattern includes analyzing the analyzed pixel data and determining the pixel pattern, and outputting flag data according to the determined pixel pattern.

The process of encoding the image includes encoding CB by calculating an average of Cb pixels corresponding to a combination of pixels less than the threshold according to the determined pixel pattern, and creating first encoded data CB1 and second encoded data CB2, encoding Cr by calculating an average of Cr pixels corresponding to a combination of pixels less than the threshold according to the determined pixel pattern, and creating first encoded data CR1 and second encoded data CR2, inserting the flag data to CB1–CB2 and CR1–CR2, and creating encoded data by combining Ya–Yd, CB1, CB2, CR1 and CR2 and flag data. The process of inserting the flag data includes inserting the flag data to the LSB of CB1, CB2, CR1 and CR2.

An image processing method according to various embodiments of the present invention further includes analyzing, when displaying an image, flag data in an encoded image and verifying a pattern, and decoding first color difference data and second color difference data according to the verified pattern.

The image processing method further includes displaying the decoded image by converting, when the display is an RGB display, the decoded luminance data, first color difference data and second color difference data, to RGB data.

As described above, the electronic device according to various embodiments of the present invention analyzes, when processing a color image, pixel values of the color image, determines the pixel pattern, and encodes the color difference data according to the determined pixel pattern. The electronic device detects a pixel pattern that differs from the pixel pattern according to the outline or boundary of image and displays the encoded image with a clear boundary or outline.

In the embodiments of the present invention, the terminology '~module' refers to a 'unit' including hardware, software, firmware or a combination thereof. For example, the terminology '~module' is interchangeable with '~unit,' '~logic,' '~logical block,' '~component,' '~circuit,' etc. A 'module' may be the least unit or a part of an integrated component. A 'module' may be the least unit or a part thereof that can perform one or more functions. A 'module' may be implemented in mechanical or electronic mode. For example, 'modules' according to the embodiments of the present invention may be implemented with at least one of an Application Specific Integrated Circuit (ASIC) chip, Field-Programmable Gate Arrays (FPGAs) and a programmable-logic device that can perform functions that have been known or will be developed.

At least part of the programming module 300 may be implemented by instructions stored in computer-readable storage media. If the instructions are executed by one or more processors, the processors can perform the functions respectively. An example of the computer-readable storage media may be a memory 220. At least part of the programming module may be implemented by the processor 210. At least part of the programming module may include module, programs, routines, sets of instructions and/or processes, in order to perform one or more functions.

Examples of computer-readable media include: magnetic media, such as hard disks, floppy disks, and magnetic tape, optical media such as CD-ROM disks and DVDs; magneto-optical media, such as floptical disks, and hardware devices that are specially configured to store and perform program instructions (programming modules), such as ROM, RAM, and flash memory. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to the present invention may include one or more components described above, remove part of the components described above, or include new components. The operations performed by modules, programming modules, or the other components, according to the present invention, may be executed in serial, parallel, repetitive or heuristic fashion. Part of the operations can be executed in any other order, skipped, or executed with additional operations.

Although certain embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

What is claimed is:

1. An electronic device comprising:
   a display that displays the image, and
   one or more processor functionally connected to the display and configured to encode the image and to decode the image,
   wherein encoding the image by the one or more processor comprises:
     determining a pixel pattern by analyzing luminance data of pixels in a unit block of the image,
     encoding the image by using the luminance data and at least one color difference data of the pixels in the unit block, wherein the at least one color difference data is generated based on a color value of at least two pixels selected based on the determined pixel pattern.

2. The electronic device of claim 1, wherein:
   pixel data of pixels of the image comprises the luminance data and at least one color value; and
   wherein encoding the image further comprises removing the at least one color value and adding the at least one color difference data.

3. The electronic device of claim 1, wherein
   at least one color value comprises blue difference chroma component Cb and
   red difference chroma component Cr.

4. The electronic device of claim 1, wherein the one or more processor comprises:
   a pixel analysis unit that analyzes luminance data of the unit block and outputs the analyzed pixel data;
   a pattern determining unit that determines a pixel pattern corresponding to the analyzed pixel data and outputs flag data of the determined pixel pattern; and
   an encoding unit that generates the at least one color difference data based on the color value of the at least two pixels selected based on the determined pixel pattern, and creates encoded data including the flag data, the luminance data, and the generated at least one color difference data.

5. The electronic device of claim 1, wherein the one or more processor
   is configured to convert, when the image is Red, Green, Blue (RGB) data, colors from the RGB data to YCbCr data.

6. The electronic device of claim 3, wherein the one or more processor is configured to:
   calculate absolute values Abs (Ya−Yb), Abs (Yc−Yd), Abs (Ya−Yc), Abs (Yb−Yd), Abs (Ya−Yd), and Abs (Yb−Yc), wherein the Ya is luminance data of a first pixel of the unit block, the Yb is luminance data of a second pixel of the unit block, the Yc is luminance data of a third pixel of the unit block, and the Yd is luminance data of a fourth pixel of the unit block; and
   compare the absolute values with a threshold; and
   output analyzed pixel data.

7. The electronic device of claim 1, wherein the one or more processor is configured to generate flag data according to the determined pixel pattern.

8. The electronic device of claim 6, wherein encoding the image comprises:
   calculating an average of Cb of pixels corresponding to a combination of pixels less than a threshold according to the determined pixel pattern, and creating first encoded data CB1 and second encoded data CB2;
   calculating an average of Cr of pixels corresponding to the combination of pixels less than the threshold according to the determined pixel pattern, and creating first encoded data CR1 and second encoded data CR2; and
   combining the Ya, the Yb, the Yc, the Yd, the CB1, the CB2, the CR1 and the CR2 and flag data to create combined encoded data.

9. The electronic device of claim 8, wherein the one or more processor is configured to insert the flag data to a Least Significant Bit (LSB) of the CB1, the CB2, the CR1, and the CR2.

10. The electronic device of claim 1, wherein decoding the image by the one or more processor comprises:
    analyzing, when displaying the image, flag data in an encoded image and verifying a pattern; and
    restoring at least one color value according to the verified pattern.

11. The electronic device of claim 10, wherein the one or more processor is configured to:
    convert, when the display is a Red, Green, Blue (RGB) display, luminance data and the at least one color value to the RGB data.

12. A method of processing images in an electronic device comprising:
    determining a pixel pattern by analyzing luminance data of pixels in a unit block of an image; and
    encoding the image by using the luminance data and at least one color difference data of the pixels in the unit block,
    wherein the at least one color difference data is generated based on a color value of at least two pixels selected based on the determined pixel pattern.

13. The method of claim 12, wherein pixel data of pixels of the image comprises at least one of the luminance data and at least one color value.

14. The method of claim 12, wherein:
at least one color value comprises blue difference chroma component Cb and
red difference chroma component Cr.

15. The method of claim 12, further comprising:
converting, when the image is Red, Green, Blue (RGB) data, colors from the RGB data to YCbCr data.

16. The method of claim 14, wherein outputting the analyzed pixel data comprises:
obtaining absolute values Abs (Ya−Yb), Abs (Yc−Yd), Abs (Ya−Yc), Abs (Yb−Yd), Abs (Ya−Yd), and Abs (Yb−Yc), wherein the Ya is luminance data of a first pixel of the unit block, the Yb is luminance data of a second pixel of the unit block, the Yc is luminance data of a third pixel of the unit block, and the Yd is luminance data of a fourth pixel of the unit block; and
comparing the absolute values with a threshold and outputting the analyzed pixel data.

17. The method of claim 12, wherein determining the pixel pattern comprises:
generating flag data according to the determined pixel pattern.

18. The method of claim 12, wherein encoding the image comprises:
calculating an average of Cb of pixels corresponding to a combination of pixels less than a threshold according to the determined pixel pattern, and creating first encoded data CB1 and second encoded data CB2;
encoding second data by calculating an average of Cr of pixels corresponding to the combination of pixels less than the threshold according to the determined pixel pattern, and creating first encoded data CR1 and second encoded data CR2; and
combining Ya, Yb, Yc, Yd, the CB1, the CB2, the CR1 and the CR2 and flag data.

19. The method of claim 18, wherein
the flag data is inserted to a Least Significant Bit (LSB) of the CB1, the CB2, the CR1, and the CR2.

20. The method of claim 12, further comprising:
analyzing, when displaying the image, flag data in an encoded image and verifying a pattern; and
decoding at least one color value according to the verified pattern.

21. The method of claim 20, further comprising:
displaying the decoded image by converting, when the display is a Red, Green, Blue (RGB) display, the decoded luminance data and the at least one color value to RGB data.

* * * * *